United States Patent
Casati et al.

(10) Patent No.: US 11,977,471 B2
(45) Date of Patent: *May 7, 2024

(54) ACTIVITY TRACING THROUGH EVENT CORRELATION ACROSS MULTIPLE SOFTWARE APPLICATIONS

(71) Applicant: ServiceNow, Inc.

(72) Inventors: Fabio Casati, Santa Clara, CA (US); Hans Joachim Gerhard Pohle, Amsterdam (NL); Sai Harini Chettla, Hyderabad (IN); Manjeet Singh, Santa Clara, CA (US); Jeroen van Gassel, Amsterdam (NL); Kiran Sarvabhotla, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,869

(22) Filed: Jun. 22, 2023

(65) Prior Publication Data

US 2023/0401139 A1    Dec. 14, 2023

Related U.S. Application Data

(63) Continuation of application No. 17/837,706, filed on Jun. 10, 2022, now Pat. No. 11,734,150.

(51) Int. Cl.
*H04L 67/50* (2022.01)
*G06F 11/34* (2006.01)
(Continued)

(52) U.S. Cl.
CPC ........ *G06F 11/3476* (2013.01); *G06F 16/285* (2019.01); *H04L 67/535* (2022.05); *H04L 67/561* (2022.05)

(58) Field of Classification Search
CPC .. G06F 11/3476; G06F 16/285; H04L 67/535; H04L 67/561
See application file for complete search history.

(56) References Cited

U.S. PATENT DOCUMENTS 4,941,084 A    7/1990    Terada
5,185,860 A    2/1993    Wu
(Continued)

FOREIGN PATENT DOCUMENTS

EP    0433979 A2    6/1991
EP    1607824 A2    12/2005
(Continued)

OTHER PUBLICATIONS

Martino, An Introduction to Deep Similarity Learning for Sequences, Jun. 1, 2020, available at https://towardsdatascience.com/introduction-to-deep-similarity-learning-for-sequences-89d9c26f8392.
(Continued)

*Primary Examiner* — Gil H. Lee
(74) *Attorney, Agent, or Firm* — McDonnell Boehnen Hulbert & Berghoff LLP

(57) ABSTRACT

An example embodiment may involve identifying local traces of related events within a plurality of event data repositories, wherein each of the event data repositories is respectively associated with a software application; using a clustering model, assigning the local traces into clusters; determining positive rules that define when pairs of the local traces are linked to a common global trace, and negative rules that define when the pairs are linked to different global traces; linking the pairs into global traces; iteratively training a similarity model to project the local traces into a vector space such that the pairs that are linked to common global traces exhibit a greater similarity with one another than the pairs that are linked to different global traces; and based on
(Continued)

the similarity model as trained, linking further local traces to the global traces.

20 Claims, 16 Drawing Sheets

(51) Int. Cl.
*G06F 16/28* (2019.01)
*H04L 67/561* (2022.01)

(56) References Cited

U.S. PATENT DOCUMENTS

| | | | |
|---|---|---|---|
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 10,372,567 B2 * | 8/2019 | Rensing ................. G06N 5/025 |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,632,303 B2 | 4/2023 | Bitterfeld |
| 11,640,369 B2 | 5/2023 | Bhogle |
| 2002/0116340 A1 | 8/2002 | Hellberg |
| 2002/0133584 A1 | 9/2002 | Greuel |
| 2002/0158969 A1 | 10/2002 | Gupta |
| 2003/0061550 A1* | 3/2003 | Ng ...................... G06F 11/3664 714/45 |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2018/0123940 A1 | 5/2018 | Rimar |
| 2019/0073257 A1 | 3/2019 | Dasgupta |
| 2019/0104398 A1 | 4/2019 | Owen |
| 2019/0377818 A1* | 12/2019 | Andritsos ........... G06F 16/2465 |
| 2020/0050689 A1 | 2/2020 | Tal |
| 2020/0204443 A1 | 6/2020 | Bar Oz |
| 2020/0301678 A1 | 9/2020 | Burman |

(56) References Cited

U.S. PATENT DOCUMENTS

2021/0194764 A1   6/2021  Badyan
2021/0250222 A1*  8/2021  Boussac ................ H04L 43/028
2022/0029886 A1   1/2022  Hameiri
2022/0334903 A1* 10/2022  Pole .................. G06F 16/24558

FOREIGN PATENT DOCUMENTS

WO        9934285 W    7/1999
WO        0052559 W    9/2000
WO        0179970 W   10/2001

OTHER PUBLICATIONS

ServiceNow, Enable fast, data-driven improvements with Process Optimization, 2020.
Servicenow, Process Optimization Data Sheet, 2021.

* cited by examiner

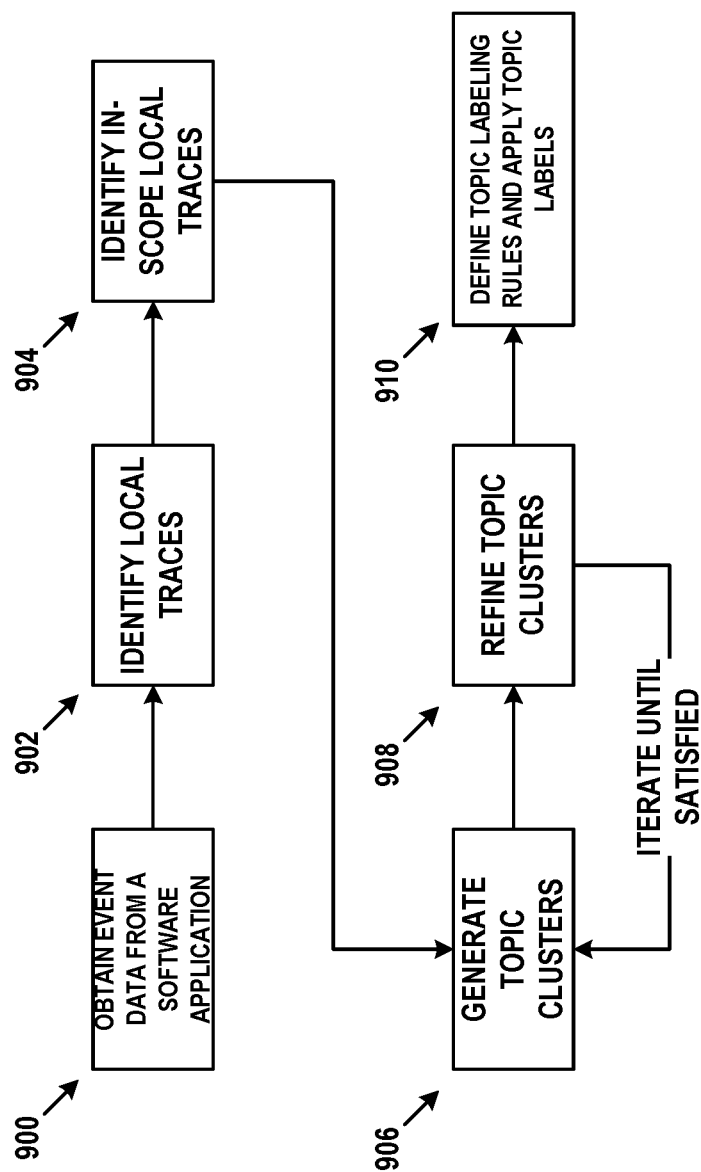

ACTIVITY TRACING THROUGH EVENT CORRELATION ACROSS MULTIPLE SOFTWARE APPLICATIONS

CROSS-REFERENCE TO RELATED APPLICATION

This application is a continuation of and claims priority to U.S. patent application Ser. No. 17/837,706, filed Jun. 10, 2022, which is hereby incorporated by reference in its entirety.

BACKGROUND

Modern software platforms include a large array of individual software applications and services that perform certain types of tasks on behalf of users. In some cases, sets of these software applications may all be capable (at least in principle) of performing the same or a similar task, but go about performing this task in different ways. Further, such a set of software applications may each be associated with a different degree of computing resource utilization (e.g., processing power, memory space, networking capacity, etc.) and/or human interaction in order to perform the task. Ideally, the software applications of this set that require relatively less human interaction are used more frequently than the software applications of this set that require relatively more human interaction. Alternatively or additionally, the software applications of this set that require relatively less computing resource utilization should be used more frequently than the software applications of this set that require relatively more computing resource utilization. But users select these software applications or are guided to them by the platform in a fashion that may not reflect these goals. Furthermore, it may not be clear which of these software applications are underperforming and are candidates for improvement.

SUMMARY

The embodiments herein overcome these and possibly other limitations of the current technology by mining event data from software applications and generating global traces of events that track journeys through these applications. Based on information in the respective sets of event data, sets of local traces can be extracted. Each local trace represents one of more interactions of a particular user with the corresponding software application. Then, using a variety of machine-learning techniques, local traces from different applications can be linked together in a global trace. Such a global trace may represent a user's journey through these applications in order to solve a particular problem that the user has experienced.

With global traces defined, further techniques can be used to determine how effective various software applications are in practice at addressing certain types of problems. For example, graphs representing the global traces can be generated that allow administrators to easily determine which journeys are could potentially be shortened by improving the performance and effectiveness of certain software applications, or the ordering of software applications that users are guided to in their journeys. This also allows administrators to determine when journeys involve over-use of software applications with high resource utilization profiles. Thus, objective evidence from these journeys can be used to reduce resource utilization across software applications.

Accordingly, a first example embodiment may involve persistent storage containing a plurality of event data repositories, each respectively associated with one of a plurality of software applications. The first example embodiment may further involve one or more machine-learning applications configured to train and execute clustering models and similarity models. The first example embodiment may further involve one or more processors configured to: identify local traces of related events within each of the plurality of event data repositories; using one or more of the clustering models, assign the local traces into clusters; based on their assigned clusters, determine positive rules that define when pairs of the local traces are linked to a common global trace, and negative rules that define when the pairs of the local traces are linked to different global traces; based on the positive rules and the negative rules, link the pairs of the local traces into global traces, wherein the global traces include local traces associated with two or more of the plurality of software applications; using the pairs of the local traces that are linked to the global traces as training data, iteratively train a similarity model to project the local traces into a vector space such that the pairs of the local traces that are linked to common global traces exhibit a greater similarity with one another than the pairs of the local traces that are linked to different global traces; and based on the similarity model as trained, link further local traces to the global traces.

A second example embodiment may involve identifying local traces of related events within each of a plurality of event data repositories, wherein each of the event data repositories is respectively associated with one of a plurality of software applications. The second example embodiment may further involve, using one or more clustering models, assigning the local traces into clusters. The second example embodiment may further involve, based on their assigned clusters, determining positive rules that define when pairs of the local traces are linked to a common global trace, and negative rules that define when the pairs of the local traces are linked to different global traces. The second example embodiment may further involve, based on the positive rules and the negative rules, linking the pairs of the local traces into global traces, wherein the global traces include local traces associated with two or more of the plurality of software applications. The second example embodiment may further involve, using the pairs of the local traces that are linked to the global traces as training data, iteratively training a similarity model to project the local traces into a vector space such that the pairs of the local traces that are linked to common global traces exhibit a greater similarity with one another than the pairs of the local traces that are linked to different global traces. The second example embodiment may further involve, based on the similarity model as trained, linking further local traces to the global trace.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 depicts assigning labels to local traces, in accordance with example embodiments.

DETAILED DESCRIPTION

Figure 1:
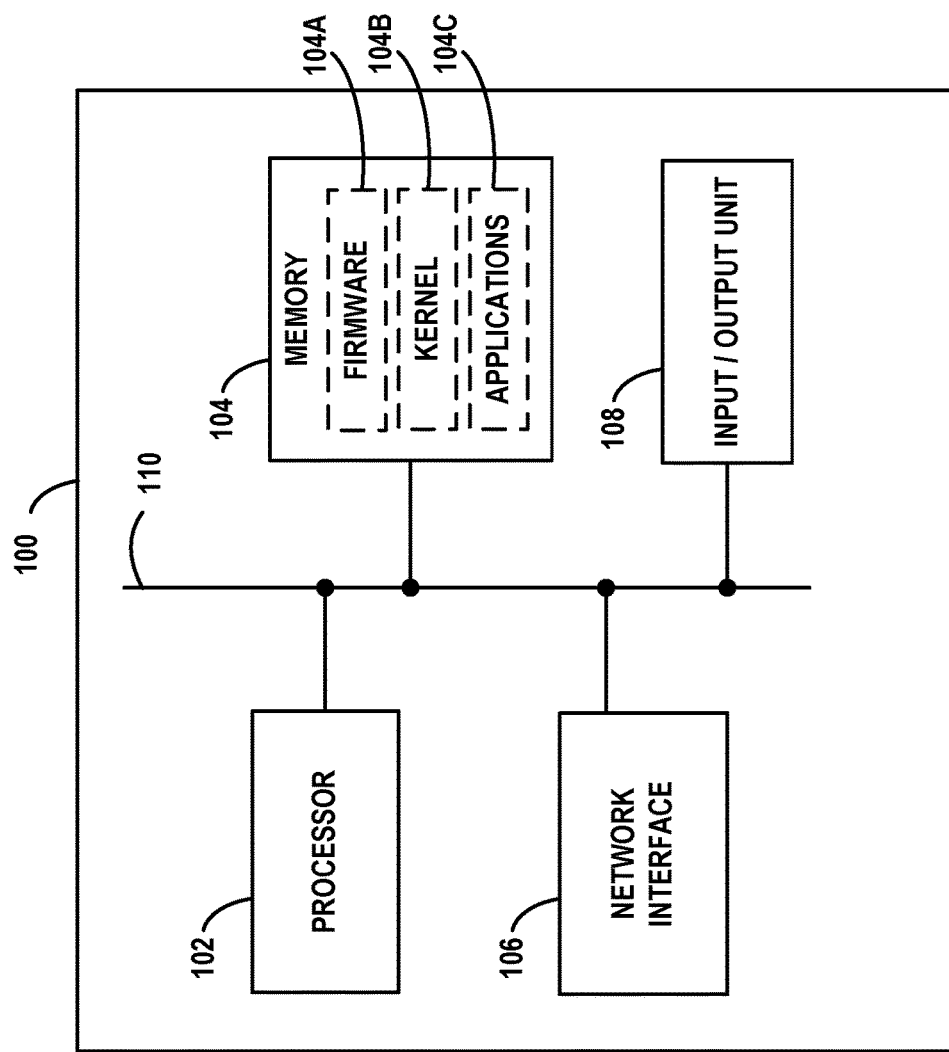
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
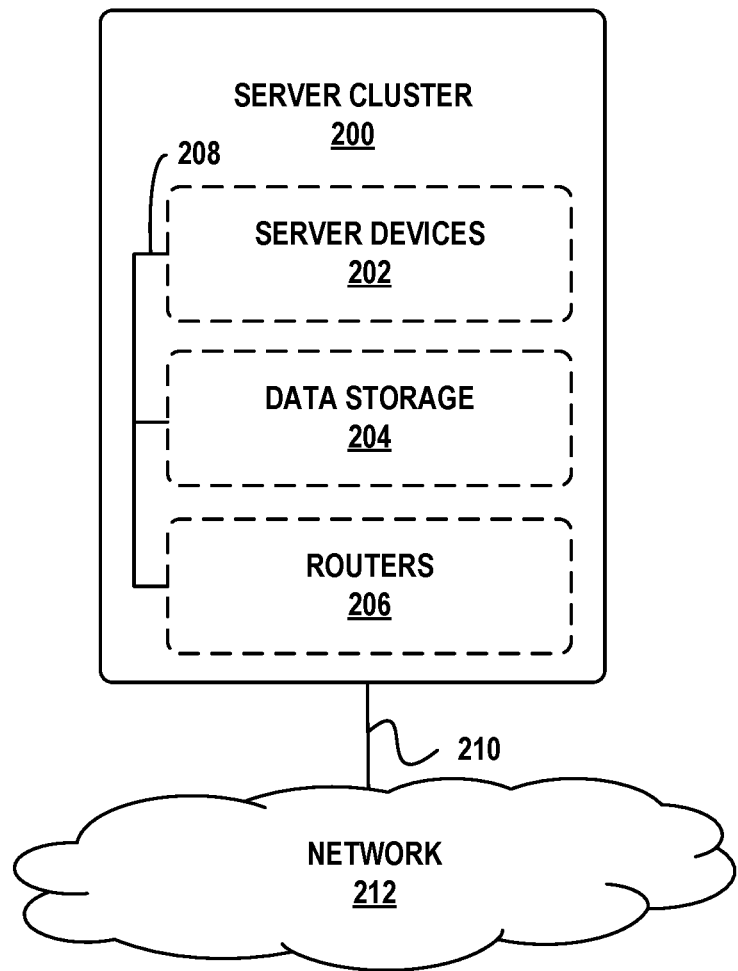
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PUP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
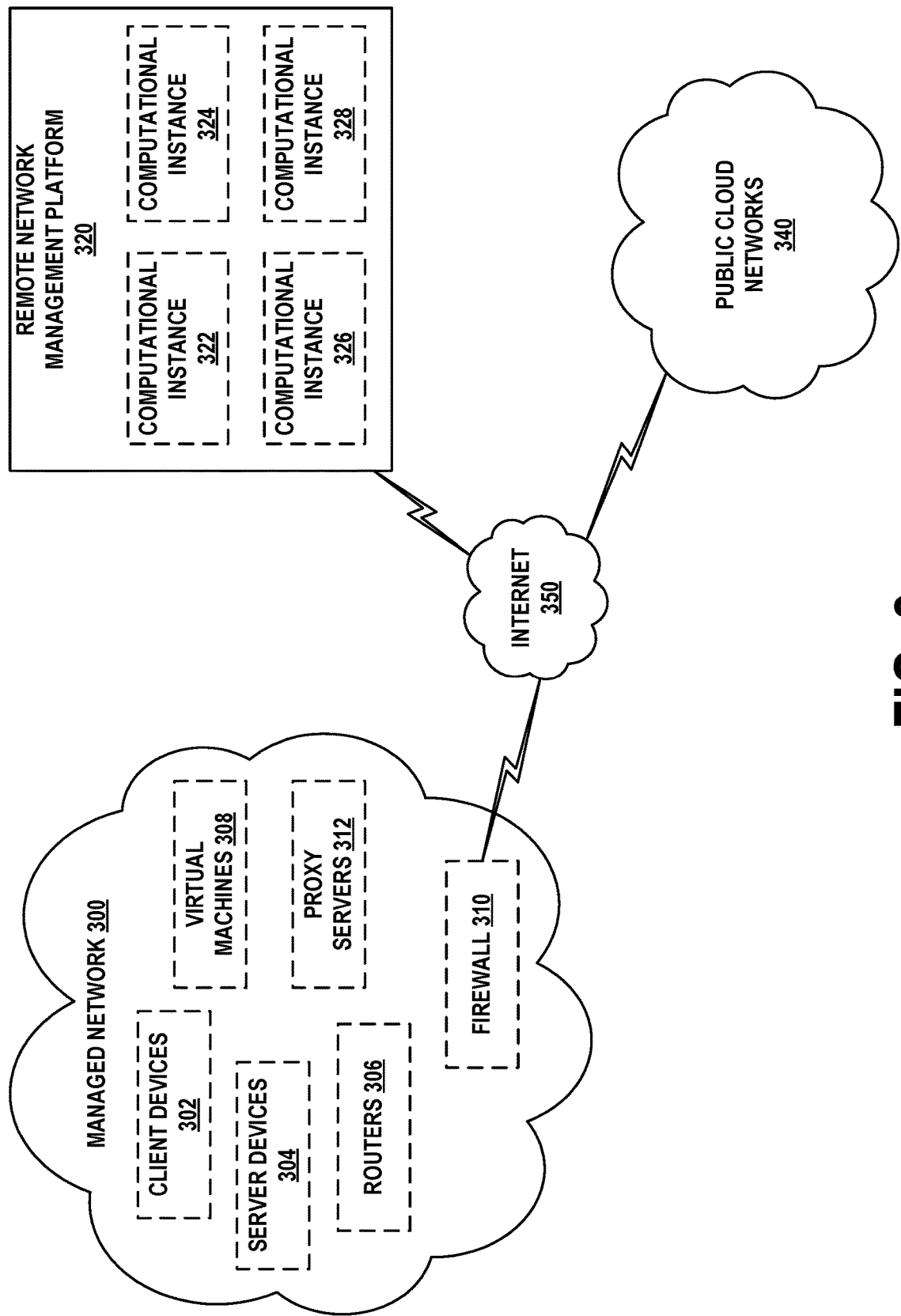
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
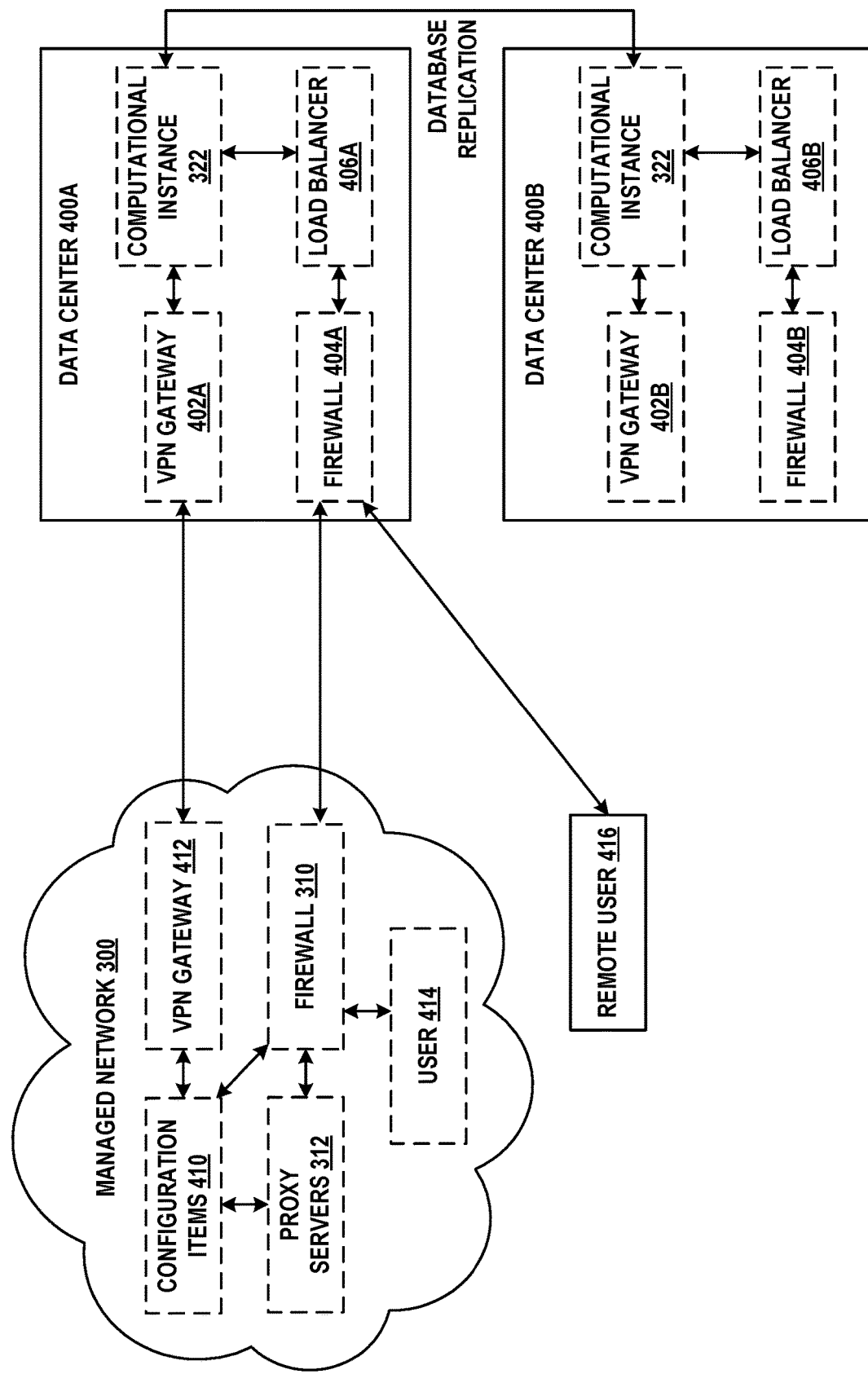
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
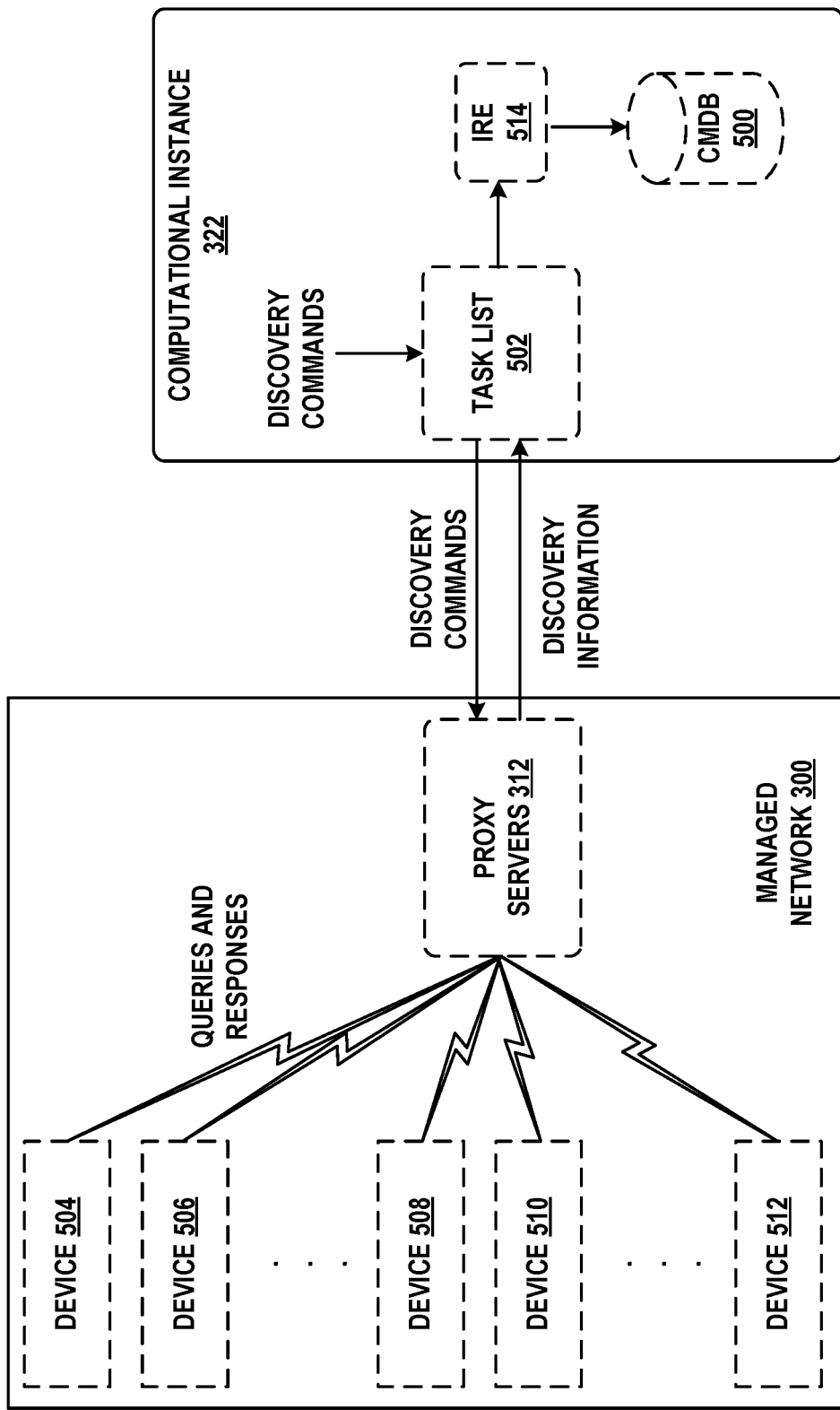
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pair-wise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device.

For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Multi-Application Solution Environments

In order to facilitate the providing of useful services to users, a remote network management platform may support different types of software applications that provide similar functions in different ways. When interacting with the remote network management platform, a user may select or be guided to these software applications in a certain order. Ideally, the user will first utilize the software application that can provide the user with the best result. But often, due to user inexperience and/or the inherent ambiguity present in natural language processing and user intent determination, the user may select or the remote network management platform may instead suggest a different software application that provides a less useful result. Or, even worse, the selected software application may not provide a result at all. Thus, in some situations, the user may have to attempt use of several software applications until one provides a satisfactory result, or the user gives up.

For example, consider the case of providing advice to users experiencing technology problems. Search, live chat, virtual agent, incident management, email, and telephony software applications may all be capable of achieving such a goal, at least in many cases. But each of these software applications may be more or less efficient in terms of accuracy and correctness. Further these software applications may also vary in terms of their resource utilization and the time they take to provide a result to a user. The resources utilized can include manual human intervention (e.g., by agents) as well as computing resource utilization (e.g., processing power, memory space, networking capacity, etc.).

It is difficult for an operator of the remote network management platform to be able to objectively evaluate the efficacy of these software applications, or to determine a preferred ordering of them so that users are provided with the desired results in a rapid fashion. Further, it is desirable to reduce the amount of resource utilization involved in providing the results.

The embodiments herein address these and potentially other issues by combining event data generated by or related to multiple software applications in order to establish an understanding of how users navigate between these software applications. This provides a representation of the journeys—how users (or other entities such as human agents or incidents) traverse the myriad software applications of the remote network management platform in order to obtain their desired results. With a large enough corpus of journey information at hand, a remote network management platform and/or its operator may be able to determine how to: (i) better arrange the recommended ordering of software applications so that the user can obtain the desired results more quickly, and/or (ii) improve the operation of one or more of the software applications so that they provide better results. All of this may also take into account the resource utilization of the software applications.

However, current remote network management platforms can be vast. They may support not only many different software applications, but multiple different underlying technologies (e.g., workflows, scripts, rules, machine-learning models, other forms of artificial intelligence, and various types of automation) can be employed by these software applications. Additionally, remote network management platforms may have numerous portals through which a user might seek information (e.g., web-based portals, mobile portals, employee-focused portals, customer-focused portals, etc.). Each portal may be independently developed and maintained by different individuals or teams that have little communication therebetween. Thus, different portals may intentionally or inadvertently guide users to different software applications.

As a consequence, the information that can be used to develop representations of journeys is distributed in a fragmented fashion throughout multiple database tables, log files, and possibly other repositories inside (or in some cases, outside) of the remote network management platform. There is no single information source that can be used to fully understand journeys, and each source may represent event data in a different format.

Figure 6:
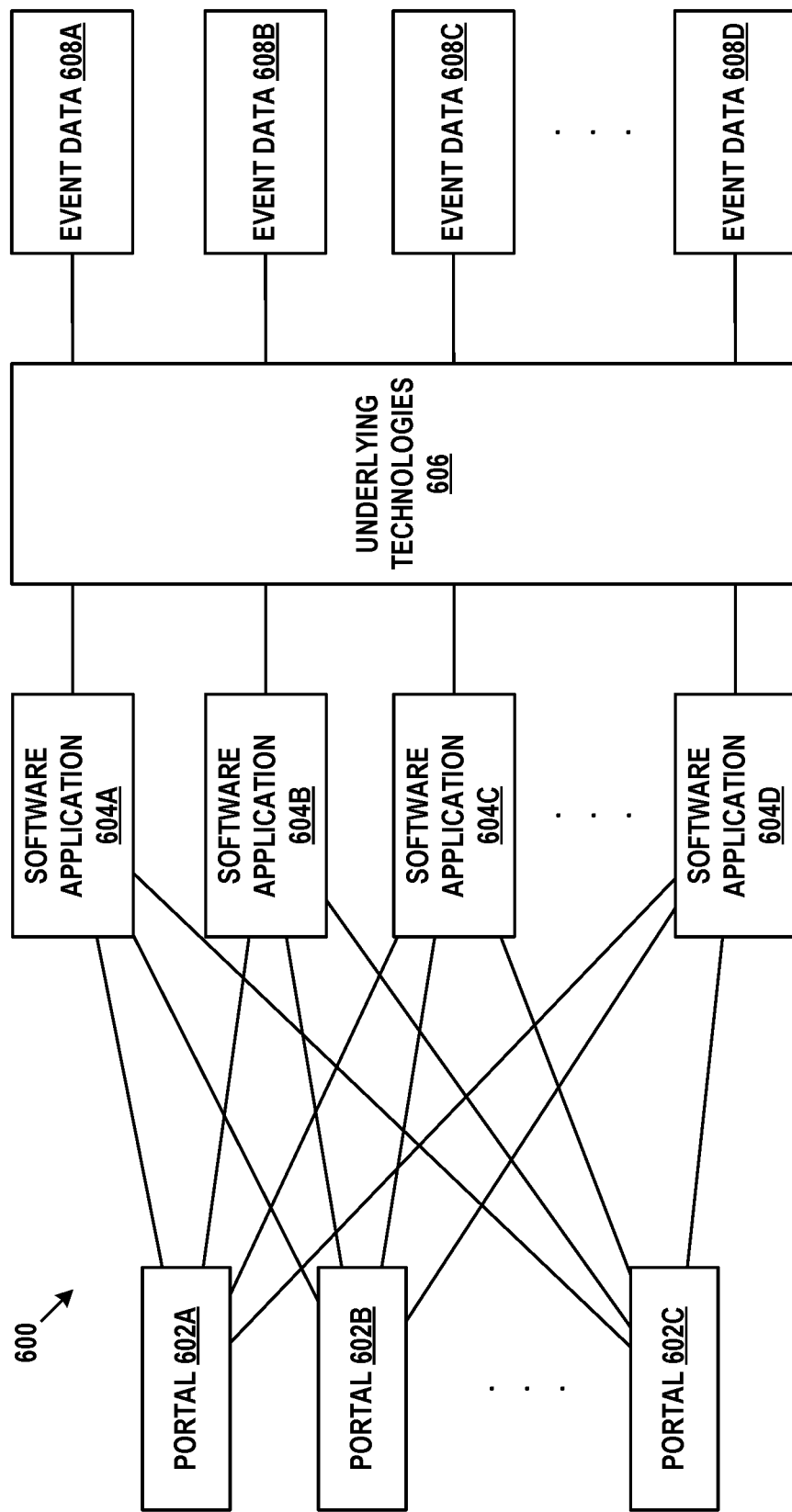
FIG. 6 depicts an arrangement of portals, software applications, and underlying technologies, in accordance with example embodiments.

FIG. 6 provides an illustrative example. Architecture 600 is a view of possible relationships between portals, software applications accessible by way of these portals, underlying technologies employed by these software applications, and event data produced by the software applications. In FIG. 6, ellipses indicate that there may be any number of portals, software applications, and event data repositories. Further, the number of underlying technologies may be substantial.

Portals 602A, 602B, and 602C may represent how a user is guided to or accesses the software applications. As an example, a web portal may be a web-based landing page that provides lists of software applications available to users, and may recommend that users with certain types of queries access the software applications in particular orderings. As another example, mobile portals may serve a similar function but reside within mobile applications installed on the users' mobile devices.

Software applications 604A, 604B, 604C, and 604D are computer programs executable on the remote network management platform or on a separate system. Examples include search, live chat, virtual agent, incident management, email, and telephony applications. Search applications may allow users to enter textual, audio, or image content and then attempt to provide relevant or otherwise related content. Live chat applications involve interactive messaging between a user and a human agent, often in textual form (though support for audio, images, and videos may be provided). Virtual agent applications involve interactive messaging between a user and a computerized agent, often in textual form (again, support for audio, images, and videos may be provided). Incident management applications may involve trouble ticketing systems that allow technology users to request assistance from human or virtual agents for specific IT-related issues. Email applications may facilitate the sending and/or receiving of electronic mail messages. Telephony applications may facilitate the conducting and managing of voice calls. Other possible software applications exist.

Each software application may be associated with one or more databases (not shown). These databases may include tables containing rows of entries that control the operation of their respective software applications to some extent. In some implementations, more than one software application may use the same database.

As shown in FIG. 6, any of portals 602A, 602B, and 602C may provide access to or recommend use or any of software applications 604A, 604B, 604C, and 604D. But in some embodiments, certain portals might only provide access to or recommend certain software applications, and these software applications may be recommended in different orderings by different portals. Software applications 604A, 604B, 604C, and 604D may be distinct and independent from one another, or may be associated in some fashion. For example, various instances of software applications 604A, 604B, 604C, and 604D may share no code in common or may share common libraries, code, or functionality. In some situations, various combinations of software applications 604A, 604B, 604C, and 604D work at least partially in conjunction with one another, such as a virtual agent application being in an attempt to deflect load from live chat or incident management applications.

To that point, underlying technologies 606 may be a set of techniques, tools, services, algorithms, and/or logic that can be used by one or more of software applications 604A, 604B, 604C, and 604D. Examples include workflows, scripts, rules, machine-learning models, other forms of artificial intelligence (AI), and various types of automation. Other possibilities exist.

As a case in which more than one software application uses the same underlying technology, search and virtual agent applications may both make use of machine-learning models for determining the intent of entered query text, as well as the similarity of such text to possible results. For instance, when a user enters a query, a search application may return the top 10 most similar results, while a virtual agent application may prompt the user to verify that their intent matches the most similar result.

Event data 608A, 608B, 608C, and 608D may be generated by software applications 604A, 604B, 604C, and 604D. This data may take the form of log files or entries in database tables, for example. Typically, event data is textual, but other formats may be used. Each event data entry may memorialize one or more interactions between a user and a software application. For instance, if a user enters a search query into software application 604B, software application 604B may log this event with the time the search query was received, the user's userid, network address, and/or other identifier, the search query text, and perhaps the result of some initial processing performed on the text (e.g., changing case or removal of stop words). The following is an example log entry for a search query entered into a search application:

[7 Apr. 2022 12:07:28] [jsmith] [192.160.1.133] ["I forgot my password"] [password reset]

This log entry takes has a format of [timestamp], [userid], [user's IP address], [search query], and [determined intent]. The log entry indicates that at 12:07:28 on Apr. 7, 2022, userid "jsmith" entered a search query of "I forgot my password", and the search application predicted that the user's intent was "password reset". Accordingly, the search application may then display one or more search results related to resetting one's password, such as a knowledge-base article with instructions on doing so.

A further example below is a log entry for a live chat message entered into a live chat application:

[7 Apr. 2022 12:15:55] [jsmith→agent] ["Can you help me reset my password?"] [password reset]

This log entry has a format of [timestamp], [sending_user→receiving_user], [chat message], and [determined intent]. The log entry indicates that at 12:15:55 on Apr. 7, 2022, userid "jsmith" sent the chat message "Can you help me reset my password?" to userid "agent", and the live chat application predicted that the user's intent was "password reset". Accordingly, the live chat application may then display this determined intent to the agent, and the agent may reply with instructions for the user to reset their password.

Figure 7:
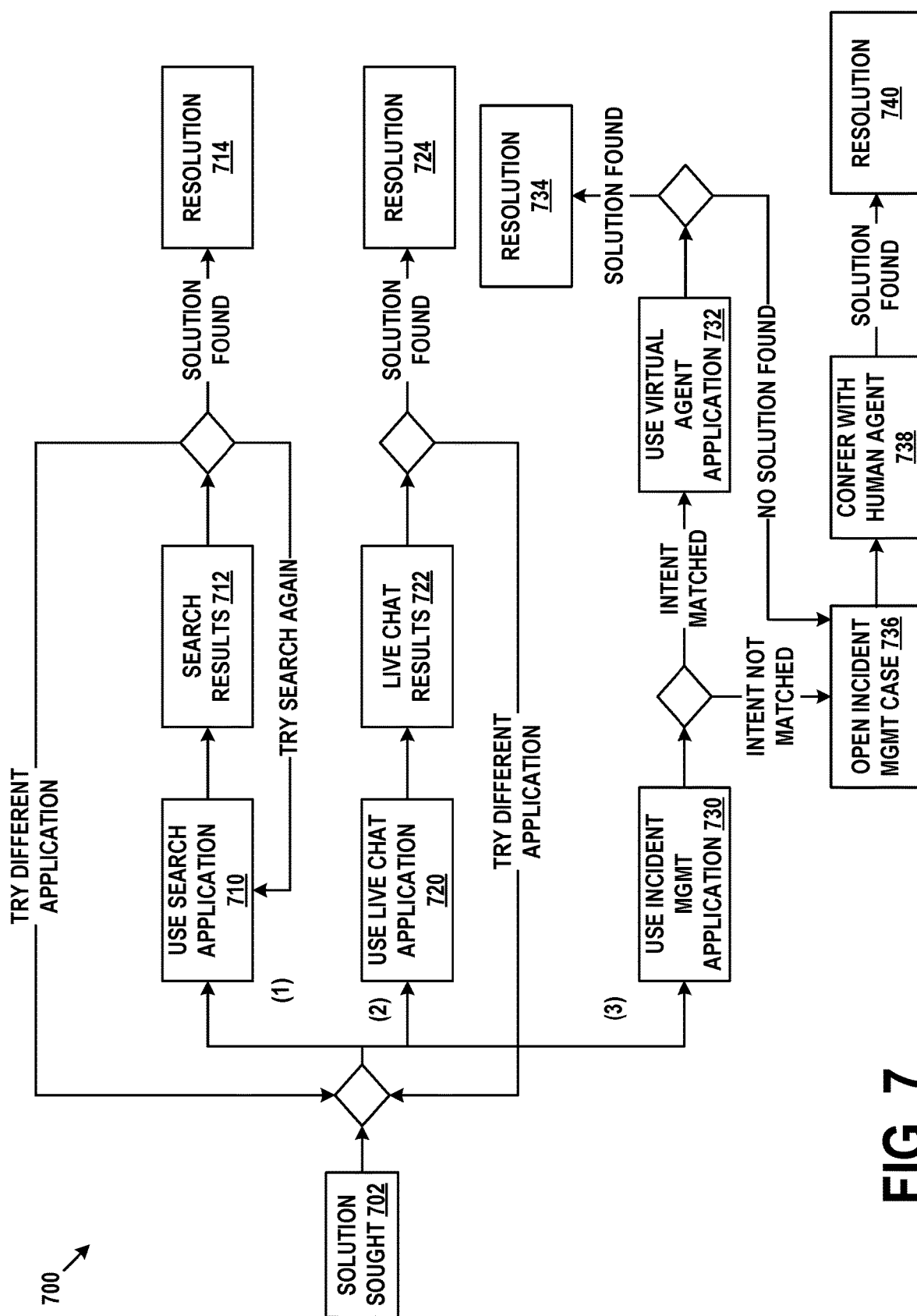
FIG. 7 depicts a possible user journey, in accordance with example embodiments.

To further illustrate these points, FIG. 7 provides an example representation of a journey in the form of flow chart 700. For sake of simplicity, it is assumed that the user has access to a search application, a live chat application, and an incident management application by way of one or more portals. It is further assumed that the incident management application will initially attempt to deflect users to a virtual agent application before involving a human agent. Decision points in FIG. 7 are shown as diamond shapes.

Thus, at block 702, a solution is sought by the user. A portal may initially recommend that the user try the search application, as indicated by the (1) designation next to the arrow leading to block 710.

At block 710, the user engages with the search application, e.g., by entering one or more search queries. At block 712, the user is provided with search results. When presented with these results, the user may determine that a suitable solution has been found, and thus the user's journey ends at block 714 with a resolution. Or, the user may determine that the search results are not helpful and that he or she should try search again by returning to block 710. Alternatively, the user may decide to try a different software application in response to determining that the search results are not helpful.

Assuming that the user decides to try a different software application, the portal may recommend that the user next try the live chat application. This is indicated by the (2) designation next to the arrow leading to block 720.

At block 720, the user engages with the live chat application, e.g., by exchanging textual messages with a human agent. This culminates at block 722 with live chat results. When presented with these results, the user may determine that a suitable solution has been found, and thus the user's journey ends at block 724 with a resolution. Or, the user may decide to try a different software application in response to determining that the live chat results are not helpful.

Assuming that the user decides to try a different software application, the portal may recommend that the user next try the incident management application. This is indicated by the (3) designation next to the arrow leading to block 730.

At block 730, the user engages with the incident management application, e.g., by submitting an incident record to the incident management application. The incident management application may attempt to determine the intent within the incident recorded, e.g., by applying natural language processing to a textual description of the problem as articulated by the user. If this result in matching a pre-established intent for which there is virtual agent support, the user may be guided to user the virtual agent application at block 732. If interaction with the virtual agent application results in a suitable solution being found, the user's journey ends at block 734 with a resolution.

If no match of a pre-established intent is found, or the virtual agent fails to find a suitable solution, an incident management case is opened at block 736. Then, at block 738, the user confers with a human agent. Assuming that the human agent can find a suitable solution, the user's journey ends at block 740 with a resolution.

Notably, this is just one possible journey. Other portals may recommend different software applications, or different orderings of software applications, or the user may decide to take other journeys. Thus, in some alternatives, the user may select which software applications to use and in what order. Further, agent journeys through the same applications may take place in a different manner.

While the process illustrated by flow chart 700 may ultimately provide solutions to the majority of user problems, it may do so in an inefficient fashion in terms of resource utilization. For example, it may be more effective for the portal to recommend or require that the user engage with the virtual agent application before engaging with the live chat application, in order to possibly solve the user's problem without involving a human agent. Further, if the search application is failing to provide a solution for a significant percentage of problems (e.g., 50%, 60%, 70%, 80%, or more), then it may be beneficial to attempt to improve the performance of the search application (e.g., perhaps by improving the search application's database or algorithm). In another example, if the intent matching techniques used by the incident management application are not accurate, this could result in underuse of the resource-efficient virtual agent application and overuse of human agents. Other possible inefficiencies and drawbacks exist. In yet another example, the search, live chat, and virtual agent applications may all rely on the same underlying technology and therefore provide the same solution to the user. But if this solution does not actually address the user's problem, resources have been wasted while the user is no closer to a resolution.

Regardless, the operator of a remote network management platform providing these software applications currently has no idea of what journeys are being taken, which are more common than others, how long they take, how many steps or user interactions they involve, or which underlying technologies are used along the way. For instance, the operator is unable to track how many users that have a particular problem are able to resolve it by using the search application, the live chat application, or the incident management application. Additionally, in cases where the search application is used but the problem is not resolved, the operator is also unable to determine whether this can be improved by tuning the search algorithm or whether even the best results provided by the search algorithm fail to lead the user to resolution. Thus, the relative and absolute efficacy of each software application are unknown. As a consequence, the utilization of software applications on the remote network management platform may be inefficient and/or ineffective.

The embodiments herein address these and possibly other technical problems by correlating event data across multiple software applications to determine journeys as paths through these applications. When a sufficient number of these journeys have been identified, they can be aggregated and/or compared in various ways to determine the effectiveness of both the journeys and the software applications they involve. As a result, software applications and portal guidance can be designed to improve the accuracy of solutions provided to users, reduce the resource utilization of the remote network management platform, and reduce the time that the user spends seeking solutions.

VII. Similarity Determination

The embodiments herein may use or rely upon various types of similarity determination between strings of text. This section describes some possible ways of determining such similarities. Thus, any of these techniques, or other similarity determining techniques, can be incorporated into the embodiments herein in various arrangements.

In particular, similarity determination may employ one or more types of machine-learning models. These models may utilize the classification and/or clustering techniques described below to facilitate similarity determination. But other machine-learning-based techniques may be used. Further, there can be overlap between the functionality of these techniques (e.g., clustering techniques can be used for classification or similarity operations). In many situations, machine-learning-based recommendations can be made from processing text in event data, and the embodiments below assume such textual records for purposes of illustration. Nonetheless, other types of information related to software applications may be used as the basis for developing and using machine-learning models Machine-learning techniques can include determining word and/or paragraph vectors from samples of text by artificial neural networks (ANNs), other deep learning algorithms, and/or sentiment analysis algorithms. These techniques are used to determine a similarity value between samples of text, to group multiple samples of text together according to topic or content, to partition a sample of text into discrete internally-related segments, to determine statistical associations between words, or to perform some other language processing task.

A word vector may be determined for each word present in a corpus of textual records such that words having similar meanings (or semantic content) are associated with word vectors that are near each other within a semantically encoded vector space. Such vectors may have dozens, hundreds, or more elements and thus may be in an m-space where m is a number of dimensions. These word vectors allow the underlying meaning of words to be compared or otherwise operated on by a computing device (e.g., by determining a distance, a cosine similarity, or some other measure of similarity between the word vectors). Accordingly, the use of word vectors may allow for a significant improvement over simpler word list or word matrix methods. These models also have the benefit of being adapted to the vocabulary, topics, and idiomatic word use common in its intended application.

Additionally or alternatively, the word vectors may be provided as input to an ANN, a support vector machine, a decision tree, or some other machine-learning algorithm in order to perform sentiment analysis, to classify or cluster samples of text, to determine a level of similarity between samples of text, or to perform some other language processing task.

Despite the usefulness of word vectors, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Similar to the methods above for learning word vectors, an ANN or other machine-learning models may be trained using a large number of paragraphs in a corpus to determine the contextual meaning of entire paragraphs, sentences, phrases, or other multi-word text samples as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs.

Word vectors and paragraph vectors are two approaches for training an ANN model to represent the sematic meanings of words. Variants of these techniques, e.g., using continuous bag of words, skip-gram, paragraph vector—distributed memory, or paragraph vector—distributed bag of words, may also be used. Additionally or alternatively, other techniques, such as bidirectional encoder representations from transformers (BERT), may be used for example. These techniques may be combined with one another or with other techniques.

Figure 8A:
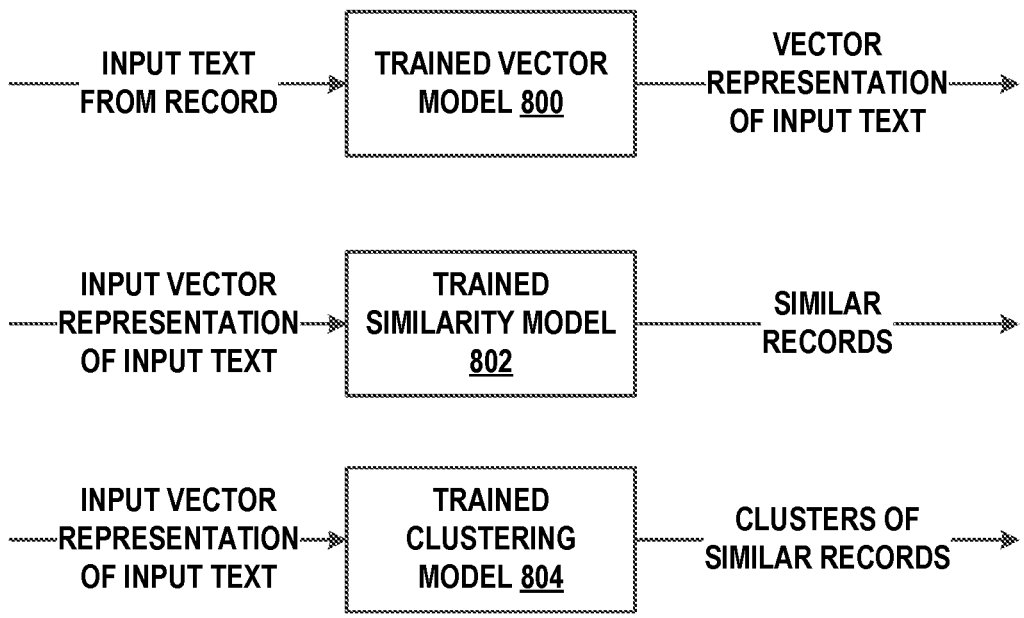
FIG. 8A depicts the respective inputs and outputs of a vector model, a similarity model, and a clustering model, in accordance with example embodiments.

As an example relevant to the embodiments herein, vector models can be trained using word vector or paragraph vector techniques for example. To that point, trained vector model 800 in FIG. 8A, takes input text from a record (e.g., event data or database entries associated with a software application), and produces a vector representation of the input text. This vector representation encodes the sematic meaning of the input text by projecting the input text into m-dimensional space. Similar units of input text will likely have similarly-located vector representations in the m-dimensional space.

Accordingly, trained similarity model 802 takes an input vector representation of input text and produces zero or more similar records—i.e., records that contain similar text. As noted above, the degree of similarity between two units of text can be determined by calculating a similarity measurement between their respective vector representations. One such measurement may be based on cosine similarity, which is defined by the following equations:

$$\text{similarity}(\vec{A}, \vec{B}) = \frac{\vec{A} \cdot \vec{B}}{\|\vec{A}\|\|\vec{B}\|}$$

$$\text{where } \|\vec{A}\| = \sqrt{A_1^2 + A_2^2 + A_3^2 + \cdots + A_m^2}, \text{ and}$$

$$\|\vec{B}\| = \sqrt{B_1^2 + B_2^2 + B_3^2 + \cdots + B_m^2}$$

In these equations, vector A could represent one input vector and vector B could represent another input vector, each of which could be derived from different event data, for example. Vector A and vector B could both be of dimension m. The similarity calculation may have an output a number between −1.0 and +1.0, where the closer this result is to +1.0, the more similar vectors A and B are to each other.

Thus, the similar records produced by trained similarity model 802 may be those with vector representations for which the respective cosine similarities with the input vector representation of the record are above a threshold value (e.g., 0.2, 0.3, 0.5, or 0.8). Alternatively, the output of similar records may be a certain number of texts (or identifiers for the certain number of input texts) for which the respective cosine similarities with the input vector representation of the record are the most similar.

The similarity calculations described above may also be used to cluster similar records. Such clustering may be performed to provide a variety of benefits. For example, clustering may be applied to a set of records in order to identify patterns or groups within the set of records that have relevance to a particular semantic meaning or intent. Such groups may facilitate the grouping of records based on such meanings or intents.

Clustering may be performed in an unsupervised manner in order to generate clusters without the requirement of manually-labeled records, to identify previously unidentified clusters within the records, or to provide some other benefit. A variety of methods and/or machine-learning algorithms could be applied to identify clusters within a set of records and/or to assign records (e.g., newly received or generated records) to already-identified clusters. For example, decision trees, ANNs, k-means, support vector machines, independent component analysis, principal component analysis, or some other method could be trained based on a set of available records in order to generate a machine-learning model to classify the available records and/or to classify records not present in the training set of available records.

For instance, clusters may be identified, for example, to include vector representations that are within a particular extent of similarity from one another, or not more than a particular Euclidian distance from a centroid in rn-space. In these models, some outlying vector representations may remain un-clustered.

Once a machine-learning model has been determined, the machine-learning model can be applied to assign additional records to the identified clusters represented by the machine-learning model and/or to assign records to a set of residual records. The machine-learning model could include parameter values, neural network hyperparameters, cluster centroid locations in feature space, cluster boundary locations in feature space, threshold similarity values, or other information used, by the machine-learning model, to determine which cluster to assign a record and/or to determine that the record should not be assigned to a cluster (e.g., should be stored in a set of residual, unassigned records). Such information could define a region, within a feature space, that corresponds to each cluster. That is, the information in the machine-learning model could be such that the machine-learning model assigns a record to a particular cluster if the features of the record correspond to a location, within the feature space, that is inside the defined region for the particular cluster. The defined regions could be closed (being fully enclosed by a boundary) or open (having one or more boundaries but extending infinitely outward in one or more directions in the feature space).

Trained clustering model 804 depicts such an arrangement in general. Particularly, trained clustering model 804 takes an input vector representation of input text and identifies a cluster of similar records (if one exists). To the extent that clusters overlap in the model, more than one cluster can be identified. The cluster or clusters may be determined based on similarity calculations (e.g., cosine similarities) between the input vector representation of the input text and that of other records in the cluster of a centroid of the cluster, for example.

Figure 8B:
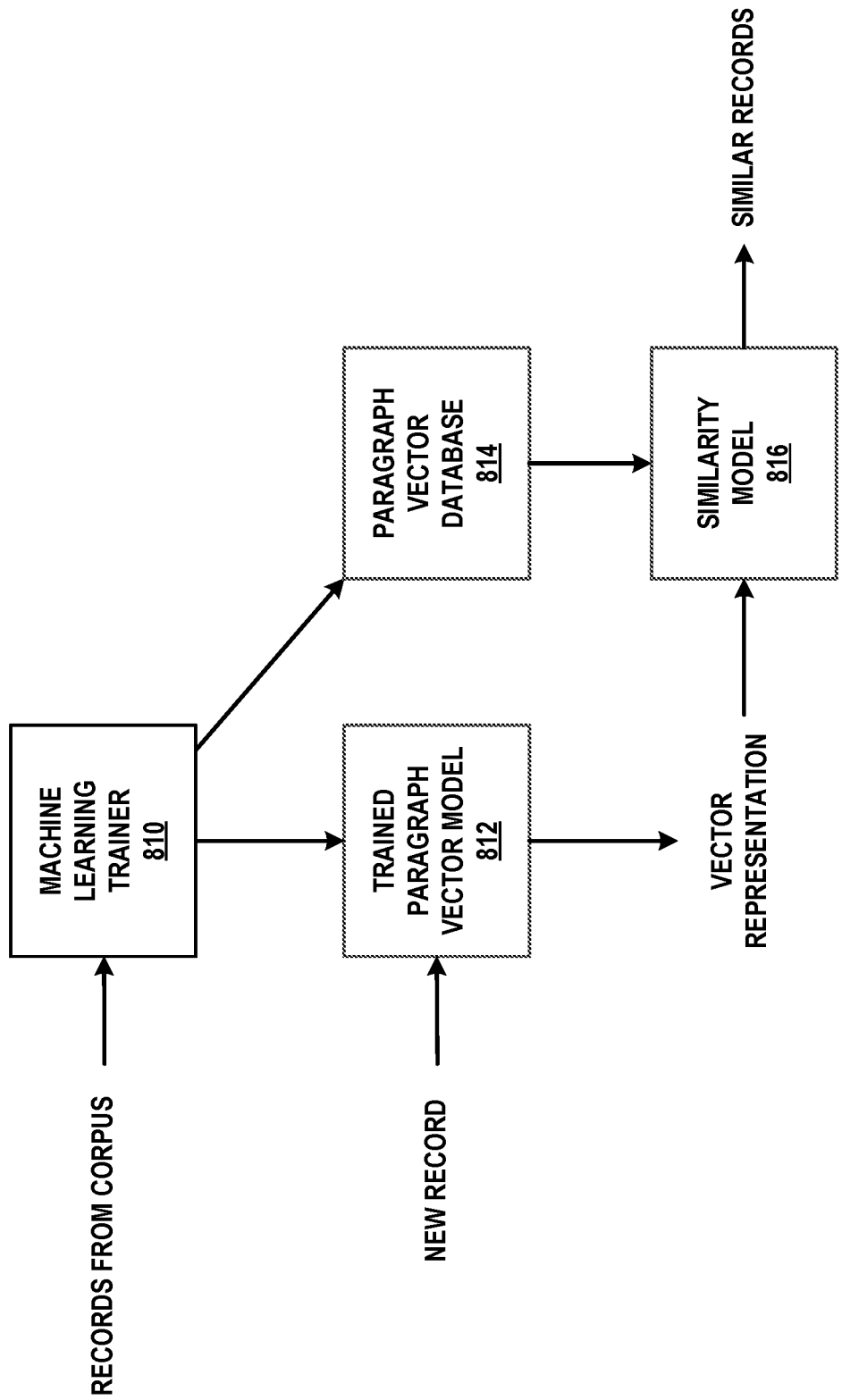
FIG. 8B depicts possible training and utilization of a vector model in conjunction with a similarity model, in accordance with example embodiments.

FIG. 8B depicts an example of these models in practice. Machine-learning trainer 810 may include one or more machine-learning training techniques that takes text fields from a corpus of event data and/or database entries, and produces trained paragraph vector model 812. For example, some or all of the example log entries specified above for a search application may be used as input into machine-learning trainer 810. Any of the above paragraph vector generation techniques could be used. Thus, trained paragraph vector model 812 may produce vector representations of input records once it is trained. This vector representation may be stored in memory and/or provided as input to similarity model 816.

Machine-learning trainer 810 may also produce paragraph vector database 814 as part of the training process. Thus, paragraph vector database 814 may contain one vector representation per record in the corpus (e.g., if the corpus contains k records, there may be k vector representations, one for each record). In some embodiments, paragraph vector database 814 may be produced by providing records in the corpus to trained paragraph vector model 812 and storing their respective vector representations as paragraph vector database 814.

Similarity model 816 may take the vector representation from trained paragraph vector model 812 as input, retrieve one or more stored vector representations from paragraph vector database 814, and calculate similarity measures (e.g., cosine similarities) between the vector representation and one or more vector representations retrieved from paragraph vector database 814. These similarity measures may be used to identify records from the corpus that are similar to the record from which the vector representation was derived. For example, if vector representation v1 derived from record r1 is determined to be similar to vector representation v2 derived from record r2, then it can be concluded that there is a semantic similarity between record r1 and record r2.

It should be noted that these inputs, outputs, and models are provided for example and other inputs, outputs, and model architectures may be possible.

VIII. Generating Representations of Journeys

The embodiments herein use event data and/or database entries associated with various software applications to generate representations of journeys through these applications. As noted, users and other parties may follow numerous paths through applications when seeking resolutions to problems. There currently is no way to generate such representations of journeys, much less doing so in a way that allows the efficiencies of the software applications and paths to be objectively evaluated.

As a first step, the notion of a "journey" needs to be defined in a meaningful way—particularly, in a way that can be used to decide whether two or more entries in the same or different sets of event data are part of the same journey. For example, suppose that the event data of the search application indicates that a user searched for a particular topic at time t1, the event data of the live chat application indicates that the user engaged in live chat about the particular topic at time t2, and the event data of the incident management application indicates that the user submitted a trouble ticket relating to the particular topic at time t3. Then, if t1, t2, and t3 are all within a threshold range of time (e.g., they are all a few minutes apart), it may be reasonable to conclude that all three sets of event data relate to the same journey. But it may be much more difficult to make this determination if t1, t2, and/or t3 are hours apart, or if the user described the topic using different words when engaging with each software application.

More formally, a possible problem statement is as follows. There are n sets of event data (e.g., log files, database entries) associated with n software applications. The set $E_i$ represents the events in set i (and thus associated with software application i), and E is the union of all sets $E_i$, where $1 \le i \le n$. Each discrete event in E includes at least a timestamp of when the event occurred and a set of attributes and properties that may be unique each the software application that generated the event. Thus, the attributes and properties used to represent events in $E_i$ may be different from those in $E_j$, where $i \ne j$. For example, different software applications may log different information in different formats.

Here, the definition of an event can be broad, including a user's initial engagement with a software application, the software application receiving data from the user, the software application making a determination of how to process this data (e.g., classification, intent determination, similarity determination), the software application providing a result to the user, and so on. In some cases, such as for the incident management application, the user's interaction with a software application may be governed by a state machine with multiple states. Therefore, transitions between such states may be recorded as events, along with related data.

Often, the user can engage multiple times with a software application, generating a series of events that are all part of the same journey. For instance, the user may enter several search queries into the search application, or transmit and receive a number of messages by way of the live chat application. Other possibilities exist.

Thus, a journey through the software applications (which could be a user journey, agent journey, or a journey of some other entity), is represented by a trace t. Thus, a trace t is a set of events $E^t$, where $E^t \subset E$, and $E_i^t$ is the set of events in trace t that are associated with software application i. Within E, there may be multiple traces, but these traces do not partition E because the same event can be part of more than one trace (e.g., a complete failure of a system can affect the journeys of multiple users.

But these traces are not known ahead of time and instead are inferred from E. Therefore, one possible goal of the embodiments herein is to produce—according to predefined criteria—one or more traces that each represent a user journey with a reasonable degree of accuracy. Notably, the goal is not necessarily to correctly identify every individual event in a trace because doing so might not be possible due to the messiness of real-world data and the variety of ways that users engage with software applications. Further, some events may be part of multiple traces.

Instead, it is acceptable for the traces identified by the embodiments herein to include some inaccuracies. Thus, the traces identified may omit certain events that were part of an actual journey thought the software applications and/or include certain events that were not part of this actual journey. So long as the traces identified are reasonably accurate representations of the actual journey, they can be used to identify inefficiencies in groups of software applications provided by a remote network management platform. Once these inefficiencies are categorized, steps can be taken to reduce or eliminate their impact by improving the applications themselves or the order in which they are recommended to users (and other entities).

There are two further challenges addressed by the embodiments herein. First, given the lack of ground truth data regarding which events make up a trace, machine-learning models cannot be trained identify traces using standard supervised techniques. Second, the event data is typically huge, encompassing many megabytes or gigabytes. Therefore, identifying traces in an efficient fashion (e.g., in terms of processor resource utilization, memory resource utilization, and time) can be important.

Thus, the embodiments herein use a combination of unsupervised and partially-supervised learning, and in some cases may involve a human providing guidance that can be used to identify traces. Generally speaking, these embodiments may involve the following five phases, each of which are described in more detail below.

The first phase may involve determining local traces from events in each set $E_i$ and then assigning labels to these local traces, where the types of labels used may vary between sets. The second phase may involve defining, in an approximate fashion, when pairs of local traces belong to the same global trace t. Positive and negative examples of such pairs may be identified. The third phase may involve training a machine-learning model that projects each local trace into a vector embedding in m-space (e.g., using word vectors, paragraph vectors, BERT, or other techniques) such that local traces that are part of the same global trace are likely to be close to one another in this space in terms of a similarity metric. The fourth phase may involve using locality sensitive hashing to categorize local traces based on the similarities of the underlying events. The fifth phase may involve linking new local traces to global traces, thus generating journeys.

A. Assigning Labels to Local Traces

FIG. 9 is a flow chart illustrating a process for assigning labels to local traces. Here, a local trace $E_i^t$ is a subset of events from event data set $E_i$ for software application i that relate to a specific user's session with software application i. Thus, $E_i$ may contain a number of local traces for different users, as well as possibly more than one local trace per user. The process illustrated in FIG. 9 takes place independently for each event data set $E_i$.

Block 900 involves obtaining event data $E_i$ from software application i. This event data may be read from one or more log files generated by the software application, database entries associated with the software application, and/or other sources.

Block 902 involves identifying local traces $E_i^t$ within $E_i$. There are numerous ways of doing so but it is assumed that the software application generates each event with at least some identifier a user (e.g., a name, number, userid, IP address, etc.). In some cases, all events relating to a particular user may be considered part of the same local trace. In these cases, there may be zero or one traces per user within $E_i$. In other cases, it is further assumed that the software application generates each event with a timestamp. Then, events relating to a particular user may be considered part of the same local trace when they appear within a predefined threshold period of time from one another (e.g., within an hour). In these cases, there may be multiple traces per user within $E_i$ if there are sequences of events relating to the user that are collectively separated from one another by more than the threshold period of time.

In still other cases, it is further assumed that the software application generates each event with a text string that is descriptive of the user's request (e.g., a search query or problem description from the user). Perhaps using the similarity techniques described above, such text strings can be projected to vector embedding in m-space so that events with similar or different topics can be identified per user. Then, events relating to a particular user may be considered part of the same local trace when they include topics that are within a threshold similarity of one another as determined by a similarity metric.

Further, these techniques can be combined. Thus, events relating to a particular user may be considered part of the same local trace when they appear within a threshold period of time from one another and when they include topics that are within a threshold similarity of one another. Still other possibilities exist.

Block 904 may involve identifying in-scope local traces. Some form of filtering may be applied to the identified traces to narrow them down, such as filtering per geographical region of the user, per timeframe, per type of user, per topic (e.g., based on keywords), and so on. This block is optional, so such filtering need not take place.

Block 906 may involve generating topic clusters from the in-scope local traces. For example, each local trace may be assigned to a particular topic. Unsupervised clustering by way of a clustering model may be used to map each local trace to a vector embedding in m-space based on the text in that local trace. Then clustering may be used to associate traces that are nearby in m-space. This can result in a set of clusters, where each cluster contains one or more local traces. In some cases, a topic may be generated for each cluster, the topic being an estimated common semantic meaning or intent of the local traces in the respective cluster. Alternatively, the topic may be generated from common words or phrases appearing in text of the local traces within the respective cluster.

For example, the topic "password" could be assigned to a cluster in which a majority of local traces include text containing the term "password" or semantically similar text. In some cases, several possible candidate topics may be identified per cluster.

Block 908 may involve refining topic clusters. This may be accomplished in a human-in-the-loop fashion. Thus, a set of clusters and their associated topics may be presented to a human administrator, and the human may modify the clusters and/or their topics. This step is also optional.

For example, the clustering model may have produced a single cluster for all local traces involving text related to computer programming. The human may decide that this single cluster should be broken up into three sub-clusters, one for JAVA programming, a second for Python programming, and a third for C++ programming. Alternatively, the human may decide to combine separate clusters identified by the clustering model, or impose a different clustering structure or criteria on the clustering model.

This human input may be provided to the clustering model and the clustering model may be re-run on the local traces. Thus, control may pass back to block 906. The clustering model may generate a new set of clusters that are more in line with the human input. Blocks 906 and 908 may be repeated until the human is satisfied with the output of the clustering model.

Block 910 may involve defining labeling rules and applying labels to each local trace. This is a follow-on to the sub-process of blocks 906 and 908. With topic clusters identified, all traces can be labeled with their respective topics. As a result, the traces and their associated labels can now be used as training data for supervised machine-learning models. Once trained, these supervised models can be used to classify new traces and/or future traces.

At this point, each local trace has been quickly and efficiently tagged with a set of pairs (e.g., a name and a value) that can be used in the next phase to determine pairs of local traces that can be matched.

B. Defining when Local Traces Belong to the Same Global Trace

Given the local traces (per software application) determined by the process of FIG. 9, a next phase is to determine which of these local traces are parts of the same cross-application global trace. Or, put another way, a further goal is to link local traces associated with different software applications that are likely to be part of the same journey. For example, based on similarity metrics calculated across text associated with local traces from a search application, a live chat application, and an incident management application, it may be determined that one or more local traces from each are part of the same journey. This process may be accomplished by way of pre-defined or administrator-provided rules.

Notably, different persons may be interested in different analysis perspectives, and as such may consider have notions of global traces, derived from different rules. The examples herein provide possible ways of determining global traces, but other definitions of global traces are possible.

Figure 10:
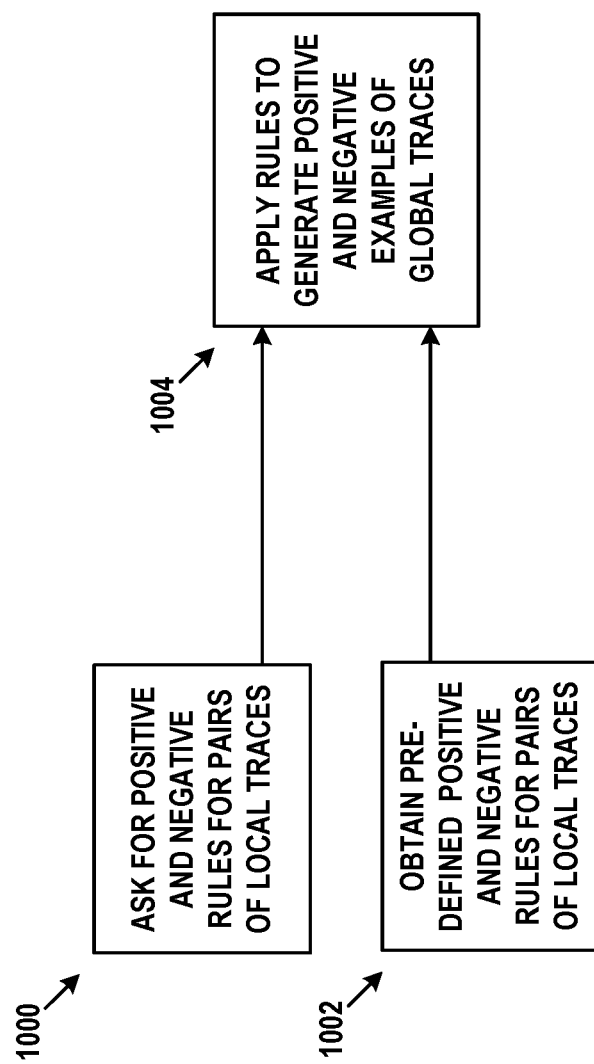
FIG. 10 depicts determining when local traces are part of the same global trace, in accordance with example embodiments.

FIG. 10 illustrates such a process. At block 1000, an administrator is asked to provide positive and negative rules that define whether a pair of local traces (presumably generated by two different software applications) are part of the same global trace. The administrator may do so by indicating that when: (i) the same user is involved, (ii) the pair is in the same cluster, labelled with the same topic, or the similarity metric for this pair is above a predetermined threshold value, and (iii) the timestamps of the local traces indicate that they took place no more than a threshold period of time apart, the pair of local traces will be consider part of the same global trace (a positive rule). Conversely, if any of these conditions are not true, then the pair of local traces will not be considered to be part of the same global trace (a negative rule). In general, there may be traces that do not fit either any positive or negative rules. Likewise, there may be traces that fit both positive and negative rules. Those traces may be disregarded when constructing the model of FIG. 11. These rules may be prioritized so that some have preference over the others in case two different rules would result in opposite outcomes for the same pair of local traces.

Here, the threshold similarity value and the threshold period of time of may be different from those of the first phase. For instance, the threshold similarity value may be lower than that of the first phase and the threshold period of time may be greater than that of the first phase. But other possibilities exist.

Alternatively or in addition to block 1000, block 1002 may involve obtaining (e.g., from memory) pre-defined positive and negative rules for pairs of local traces. These pre-defined rules may be supplied by the operator of the remote network management platform or may be administrator-provided rules that were previously obtained and stored.

Block 1004 may apply any combination of the rules from blocks 1000 and 1002 to the local traces produced by phase 1. Doing so results in positive examples of global traces (sets of local traces that are considered to be part of the same global trace) and negative examples of global traces (sets of local traces that are not part of the same global trace).

Note that the pairwise rules of blocks 1000 and 1002 may be chained together to produce global traces consisting of three or more local traces. As an example, suppose that application of the rules determine that a local trace generated by a search application and a local trace generated by a live chat application are part of the same global trace. Suppose further that the rules also determine that the local trace generated by a live chat application and a local trace generated by an incident management application are part of the same global trace. Then, due to this linkage, the three local traces may also be considered part of the same global trace. Alternatively, the three local traces may be considered part of the same global trace only when each of the three pairings of the local trace generated by the search application, the local trace generated by the live chat application, and the local trace generated by the incident management application meet the requirements of the rules.

The goal of this phase is not to be able to perfectly determine whether all local traces belong to global traces. The noisiness of the data may made such a determination computationally infeasible. Instead, the goal is to gather enough examples of global traces in order to train machine-learning models in the following phases.

C. Training a Model to Project Local Traces into a Vector Representation

Figure 11:
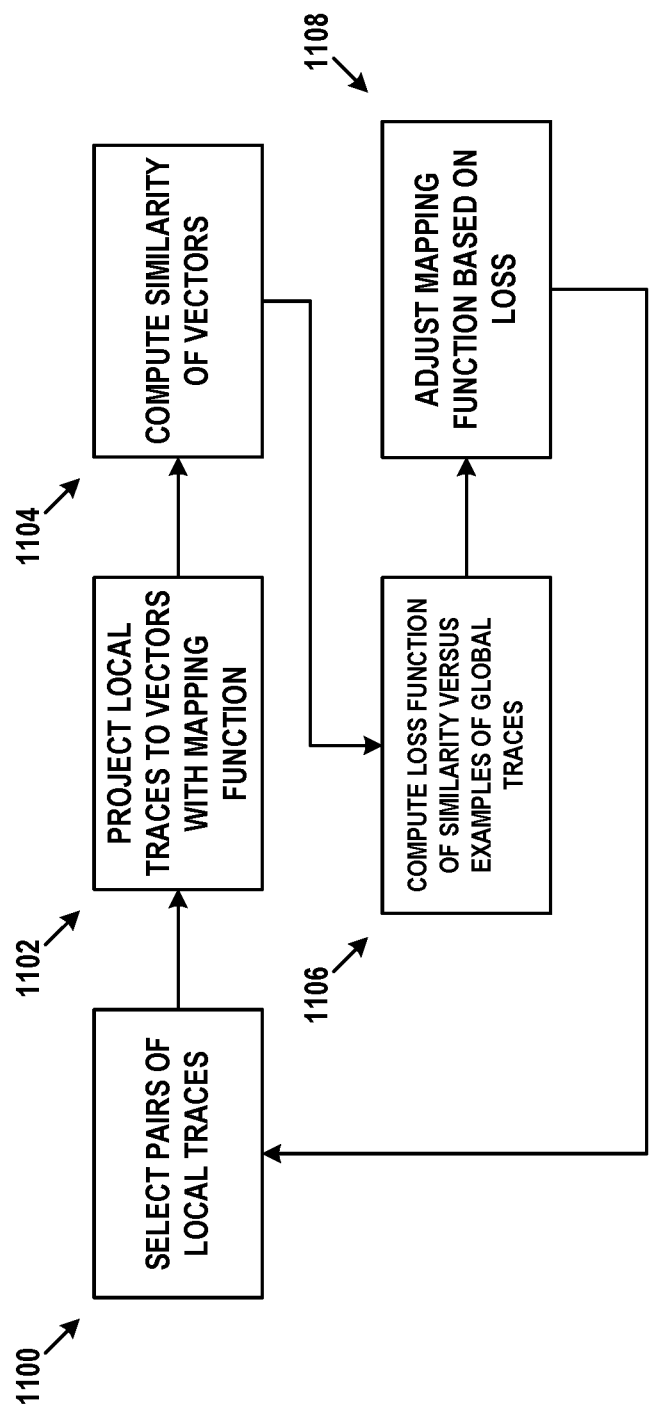
FIG. 11 depicts training a machine-learning model to generate vectors from local traces, in accordance with example embodiments.

The third phase uses the examples of global traces produced by the second phase in order to conduct supervised training of a machine-learning model. Such training results in the model being able to project local traces into vectors such that local traces that are part of the same global traces are likely to be nearby one another (have a high similarity) in this vector space. FIG. 11 illustrates such a training process.

Block 1100 may involve selecting pairs of local traces from different software applications. These selections may be random, based on a selection algorithm, or based on human input. Any number of pairs can be selected, but the model training is likely to produce better results when at least a few hundred pairs are considered.

Block 1102 may involve projecting the pairs of local traces into m-space vectors with a mapping function. This projection may be accomplished by iteratively training a neural network with an m-node hidden layer such that introducing a local trace into the neural network results in the hidden layer being usable as the vector. In other words, the encoder of the neural network (one or more layers applied before the hidden layer) gets trained to obtain the vector as a latent feature of the local trace. Other possibilities exist.

Block 1104 may involve computing a similarity value for the vector representations of pairs of local traces. As noted, a distance, a cosine similarity, or some other similarity metric may be used.

Block 1106 may involve computing a loss function of the similarity value versus suitable examples from the global traces. The positive and negative global traces may be used a ground truth values of similarity. For instance, if the similarity metric produces a value between −1.0 (no similarity at all) and +1.0 (perfectly similar), a positive global trace example may be assigned a similarity value of +1.0 and a negative global trace example may be assigned a similarity value of −1.0. The loss function may compute a difference between these similarity values determined in block 1104 and the corresponding ground truth values from the global traces (e.g., absolute values of the difference will be between 0.0 and 2.0). The magnitude of the difference determined how well the projection of block 1102 performed.

Block 1108 may involve adjusting the mapping function based on the computed loss value. This could include back-propagating updates to the weights and/or hyperparameters of the neural network based on the loss value. Thus, the back-propagation may first update the decoder of the neural network (one or more layers applied after the hidden layer) and then the encoder. But other possibilities exist.

With enough iterations and training of the mapping function in this fashion, the accuracy of the mapping function is expected to increase. Once the loss value becomes relatively static (e.g., is changes no more than a threshold amount), the mapping function is considered to be trained.

The outcome of this training is that local traces that are part of the same global trace will be mapped to points in space that are close in terms of the similarity metric, while local traces that are not part of the same global trace will be mapped to points in space that are further apart in terms of the similarity metric.

D. Locality-Sensitive Hashing

At the end of the third phase, a machine-learning model has been trained to produce mappings from local traces into m-space vectors. But, as noted, the number of local traces may be quite large—perhaps in the thousands or more. Thus, the total number of possible pairs of local traces can be in the millions. A goal may be to determine whether a given local trace is part of a global trace (or whether two local traces are part of the same global trace). But doing so naively is computationally inefficient due to the voluminous amount of data.

The fourth phase involves using locality sensitive hashing to reduce the amount of computation needed to achieve this goal. Locality sensitive hashing involves using a hash function to map the vector representation of local traces into buckets such that vectors that are nearby (similar) in the vector space are likely to be mapped to the same bucket. The number of buckets is much smaller than the vector space, so locality sensitive hashing employs a dimensionality reduction technique to map m-space vectors into buckets in a locality-preserving fashion. Such a locality-preserving hash function is the opposite of a cryptographic hash functions, where the goal is to distribute the input to the hash function to buckets quasi-randomly or in an otherwise unpredictable fashion. Examples of locality-preserving hash functions include the Nilsimsa Hash and TLSH.

Placing the local traces into buckets dramatically reduces the amount of time required to search for similar local traces. Namely, for a given local trace that maps to a particular bucket, only the local traces in the same bucket need be searched rather than the entire m-space of vectors.

Figure 12:
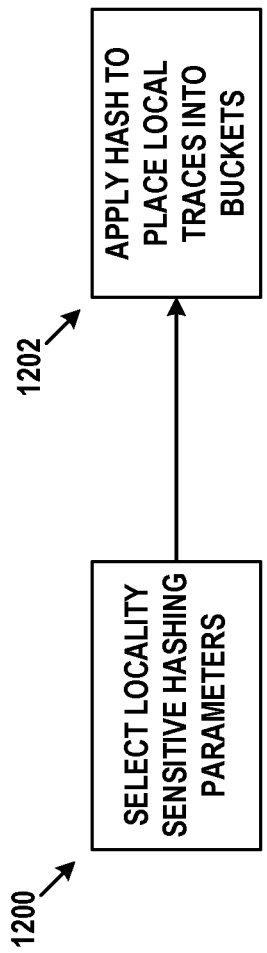
FIG. 12 depicts locality sensitive hashing, in accordance with example embodiments.

FIG. 12 depicts the locality sensitive hashing process. Block 1200 may involve selecting locality sensitive hashing parameters. These parameters may include one or more thresholds, approximation factors, and/or probabilities. Block 1202 may involve applying the locality sensitive hash function to place the local traces into buckets based on the vector mappings of the local traces. The number of buckets may be a few tens, hundreds, or more—but far less than the number of permutations of possible locations in the m-space.

In some embodiments, the fourth phase might not be necessary. Thus, locality sensitive hashing may be omitted, for instance, when the event data is relatively small.

E. Linking New Local Traces to Global Traces

Figure 13:
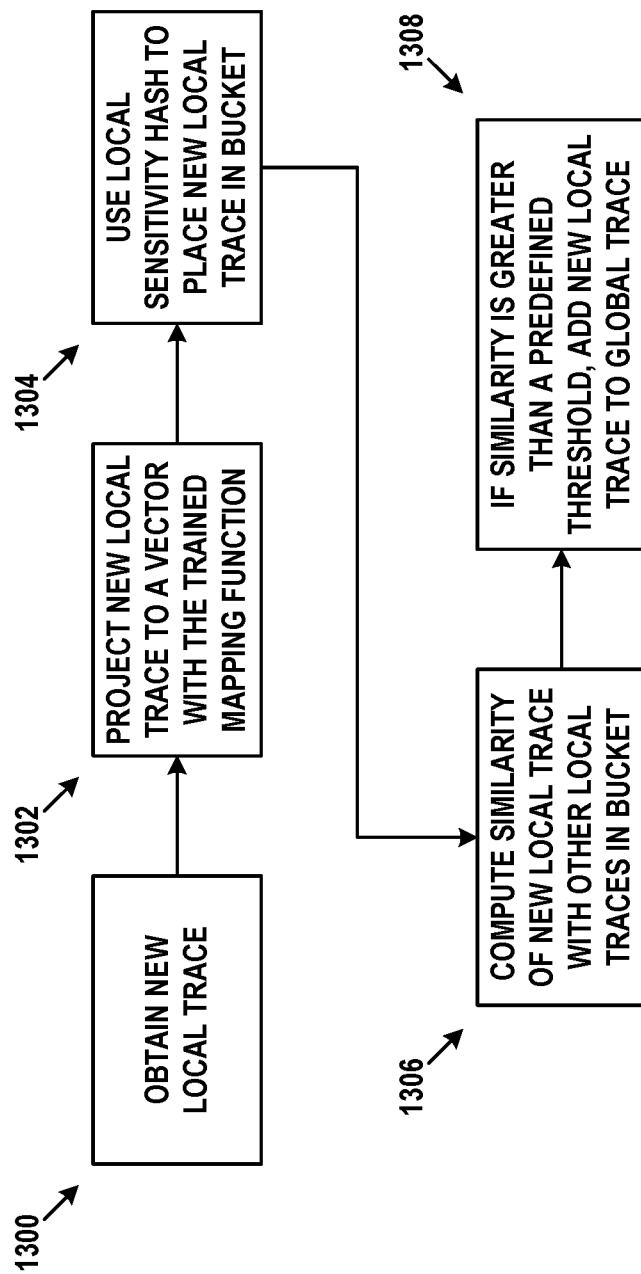
FIG. 13 depicts linking new traces to global traces, in accordance with example embodiments.

Once the local traces are appropriately placed into buckets, new traces can be linked to or otherwise associated with the global traces to which they are likely to belong. This fifth phase can be implemented by following the procedure of FIG. 13. For sake of simplicity, local traces are selected from the event data of the software applications in a given ordering (e.g., search first, then live chat, then incident management), local traces are processed one at a time, and it is assumed that each local trace belongs to at most one global trace. But in some embodiments, these constraints can be lifted.

Block 1300 may involve obtaining a new local trace. The new local trace may be read from event data that was generated by or associated with a particular software application.

Block 1302 may involve projecting the new local trace to a vector by using the trained mapping function. Thus, the vector encodes a compact representation of the semantic content of the trace.

Block 1304 may involve using a locality sensitive hash on the vector to place the new local trace in a bucket of local traces. As noted, this results in the vector being placed in a bucket in which the other local traces are likely to be semantically similar to the new local trace.

Block 1306 may involve computing the similarity between the new local trace and at least some of the other local traces in the bucket. This may be implemented as calculating pairwise similarity values for the vector representation of the new trace and the vector representations of one or more of the other local traces.

Block 1308 may involve adding the new local trace to a global trace if the calculated similarities is greater than a threshold value. Note that this threshold may be the same or different as other similarity thresholds discussed herein. In cases where the new local trace meets this criteria for multiple other local traces, the new local trace may be added to a global trace that includes the other local trace with which it has the highest similarity. If the other local trace is not already part of a global trace, a new global trace may be generated from the new local trace and the other local trace. Thus, once enough local traces are processed in this fashion, the global traces become representations of journeys through the software applications.

As noted above, phases one through four are effective training phases, which phase five is the execution phase. In other words, phases one through four might take place once every few weeks or months to train the machine-learning elements and obtain an arrangement of buckets, whereas phase five might take place any time one is seeking to determine representations of journeys.

IX. Journey Representations and their Advantages

Figure 14:
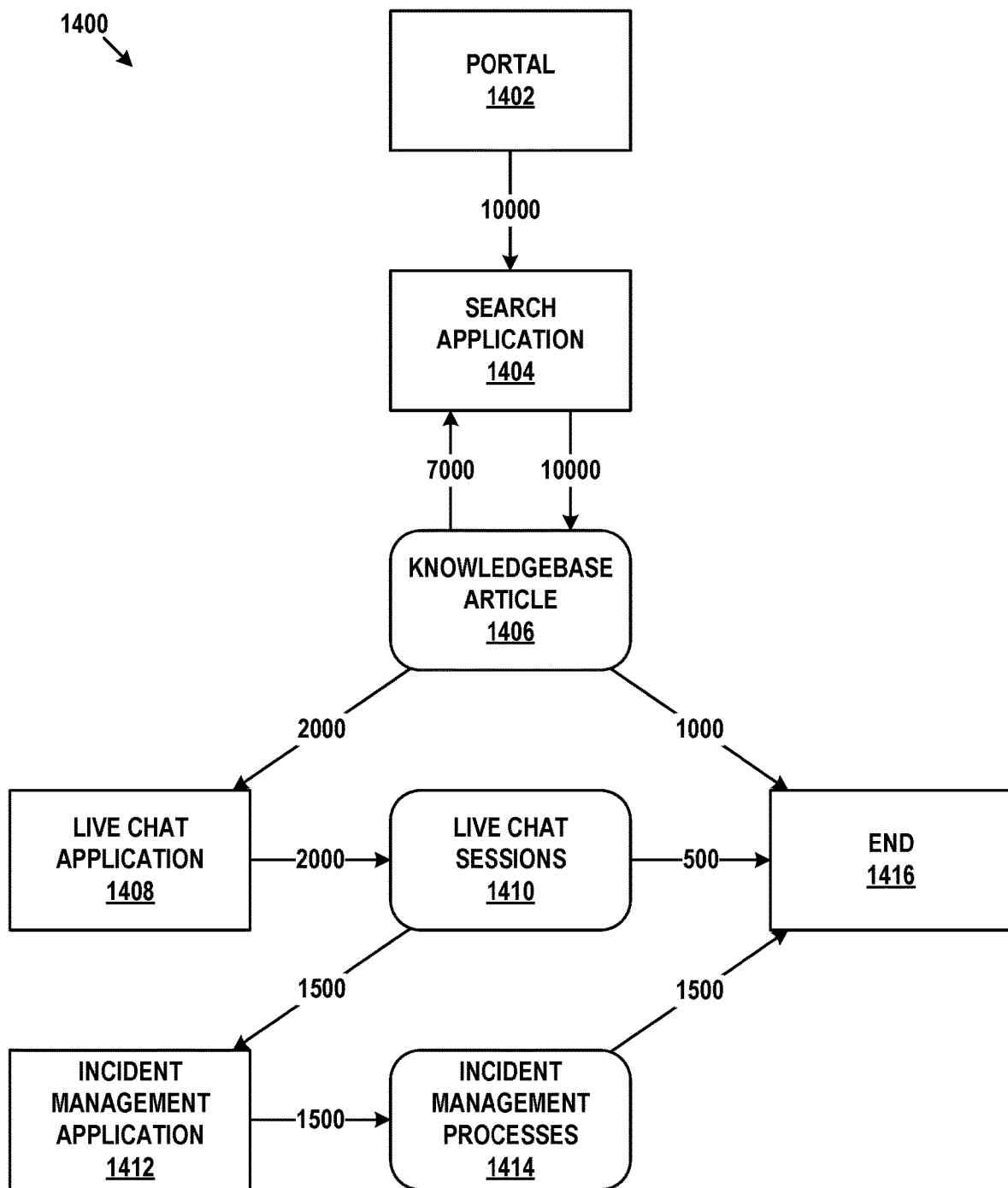
FIG. 14 depicts a graph representation of journeys through software applications, in accordance with example embodiments.

Once a sufficient number of journeys (e.g., a few hundred or a few thousand) have been discovered by way of the embodiments described herein, they can be presented for review in a number of ways. One such possible presentation is shown in FIG. 14.

Graph 1400 is an overlay of 10000 journeys through a set of software applications that include search application 1404, live chat application 1408, and incident management application 1412. Each node in graph 1400 indicates a state and each edge indicates the number of journeys that traversed between the states that the edge connects.

To that point, all of the journeys begin at portal 1402, which then directs the journeys to search application 1404. The label 10000 on the edge connecting portal 1402 and search application 1404 indicates that all 10000 journeys traverse this edge.

Similarly, the label 10000 on the edge connecting search application 1404 and knowledgebase article 1406 indicates that all 10000 journeys also traverse this edge. Knowledgebase article 1406 may be one of many possible articles or resources that appear in search results of search application 1404.

Once a journey arrives at knowledgebase article 1406 it may take one of three routes. Most journeys return to search application 1404, as indicated by the edge with the label 7000 that leaves knowledgebase article 1406. Some journeys proceed to live chat application 1408, as indicated by the edge with the label 2000 that leaves knowledgebase article 1406. Other journeys proceed to end 1416, as indicated by the edge with the label 1000 that leaves knowledgebase article 1406. When a journey reaches end 1416, it is assumed that the entity conducting the journey (e.g., a user, agent, administrator, or other entity) has resolved their problem.

Thus, knowledgebase article 1406 resolves 10% of problems, while 90% of these problems remain unsolved. Of those, the majority return to search application 1404 (e.g., so that the user can enter a different search request), while the others proceed to live chat application 1408. This suggests that either knowledgebase article 1406 is not well-situated for resolving problems, and/or search application 1404 often provides knowledgebase article 1406 (or a link thereto) in response to unrelated search requests. In either case, this observation has identified potential inefficiencies among the software applications and how they are used.

Live chat application 1408 directs all journeys to live chat sessions 1410. Each instance of live chat sessions 1410 may be unique per journey (i.e., a dialog between a user and a human agent). Once a journey arrives at live chat sessions 1410 it may take one of two routes. Most journeys proceed to incident management application 1412, as indicated by the edge with the label 1500 that leaves live chat sessions 1410. But some journeys proceed to end 1416, as indicated by the edge with the label 500 that leaves live chat sessions 1410.

Thus, live chat sessions 1410 resolves 25% of problems, while 75% of these problems remain unsolved. This suggests that live chat sessions 1410 are not a particularly effective way of resolving problems. It may be that the human agents involved in these sessions are poorly trained or do not have access to a sufficient amount of information to resolve a wide array of problems. Alternatively or additionally, the user interface of live chat application may not be conducive to effective communication.

Incident management application 1412 directs all journeys to incident management processes 1414. Each instance of incident management processes 1414 may be unique per journey (i.e., processing of a trouble ticket submitted by the entity undertaking the journey). Here, it is assumed that eventually all problems are resolved by incident management processes 1414. Notably, there may be significant delay between when an incident is submitted and a resolution is found.

The example shown in FIG. 14 is simplified for sake of presentation. Other graphs representing journeys may have more back links (from later nodes in the graph to earlier nodes in the graph), and may include more software applications. Nonetheless, the presentation of information in graph 1400 immediately identifies at least the two system-level problems discussed above relating to search application 1404 and live chat application 1408. In addition to directing an administrator to address these problems, graph 1400 also may motivate such an administrator to consider other possible solutions, such as replacing the live chat application with a virtual chat application (which would likely use fewer resources).

X. Example Operations

Figure 15:
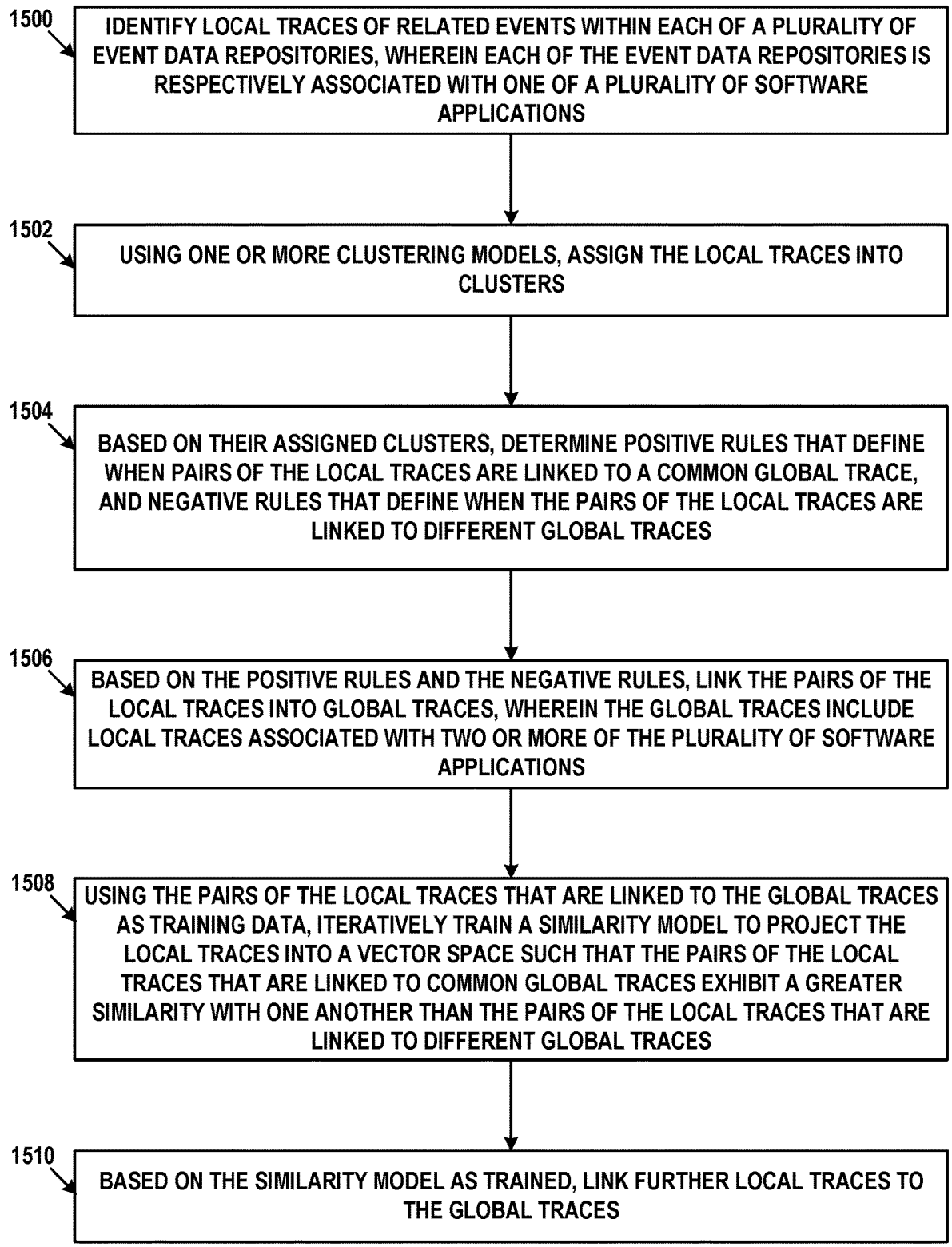
FIG. 15 is a flow chart, in accordance with example embodiments.

FIG. 15 is a flow chart illustrating an example embodiment. The process illustrated by FIG. 15 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 15 may be simplified by the removal of any one or more of the features shown therein. Further, these embodiments may be combined with features, aspects, and/or implementations of any of the previous figures or otherwise described herein.

Block 1500 may involve identifying local traces of related events within each of a plurality of event data repositories, wherein each of the event data repositories is respectively associated with one of a plurality of software applications.

Block 1502 may involve, using one or more clustering models, assigning the local traces into clusters.

Block 1504 may involve, based on their assigned clusters, determining positive rules that define when pairs of the local traces are linked to a common global trace, and negative rules that define when the pairs of the local traces are linked to different global traces.

Block 1506 may involve, based on the positive rules and the negative rules, linking the pairs of the local traces into global traces, wherein the global traces include local traces associated with two or more of the plurality of software applications. In some cases, this may involve training and applying a machine-learning model to be able to predict when the local traces belong to the same global trace.

Block 1508 may involve, using the pairs of the local traces that are linked to the global traces as training data, iteratively training a similarity model to project the local traces into a vector space such that the pairs of the local traces that are linked to common global traces exhibit a greater similarity with one another than the pairs of the local traces that are linked to different global traces.

Block 1510 may involve, based on the similarity model as trained, linking further local traces to the global traces.

In some embodiments, events in a particular event data repository were generated by its respectively associated software application.

In some embodiments, identifying the local traces of related events within each of the plurality of event data repositories comprises determining a local trace as a set of related events that: (i) identify a particular user, (ii) have timestamps within a predefined threshold period of time, or (iii) contain semantically similar textual content.

In some embodiments, identifying the local traces of related events within each of the plurality of event data repositories comprises filtering the local traces to include only those that are associated with a particular geographic region, a particular timeframe, a particular type of user, or contain one or more particular keywords.

In some embodiments, assigning the local traces into the clusters is based on semantic similarity of events within the local traces.

Some embodiments may involve, based on their assigned clusters, respectively associating the local traces with topics, wherein the topics are related to semantic content of their associated local traces, and wherein the determination of the positive rules and the negative rules is influenced by the topics.

Some embodiments may involve, based on human input, refining the associations between the local traces and the topics.

In some embodiments, iteratively training the similarity model is also based on the pairs of the local traces that are linked to different global traces.

In some embodiments, the similarity model maps the vector space to a numeric similarity value with a predefined range.

In some embodiments, iteratively training the similarity model comprises: calculating a numeric similarity value for a pair of the local traces; using a loss function, calculating a loss value by comparing the numeric similarity value with whether the pair of the local traces are linked to a common global trace; and adjusting parameters of the similarity model based on the loss value.

Some embodiments may involve, using a locality-preserving hash function, mapping vectors associated with each of the local traces into one of an array of buckets, wherein linking the further local traces to the global traces comprises: using the locality-preserving hash function to determine a particular local bucket for a further local trace; and linking the further local trace to a particular global trace by comparing the further local trace only to a set of the local traces that are mapped to the particular local bucket.

In some embodiments, comparing the further local trace only to the set of the local traces that are mapped to the particular local bucket comprises: using a further similarity model, calculating pairwise similarity values for the further local trace and each of the set of the local traces; determining that one or more of the pairwise similarity values exceed a predetermined threshold; and linking the further local trace to at least some of the local traces for which the pairwise similarity values exceeded the predetermined threshold.

XI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
identifying local traces of related events associated with a plurality of software applications;
determining positive rules that define when pairs of the local traces are linked to a common global trace, and negative rules that define when the pairs of the local traces are linked to different global traces;
based on the positive rules and the negative rules, linking the pairs of the local traces into global traces; and
using the pairs of the local traces that are linked to the global traces as training data, iteratively training a similarity model such that the pairs of the local traces that are linked to common global traces exhibit a greater similarity with one another than the pairs of the local traces that are linked to different global traces.

2. The method of claim 1, wherein events associated with a particular software application were generated by the particular software application.

3. The method of claim 1, wherein identifying the local traces of related events associated with the plurality of software applications comprises:
determining a local trace as a set of related events that: (i) identify a particular user, (ii) have timestamps within a predefined threshold period of time, or (iii) contain semantically similar textual content.

4. The method of claim 1, wherein identifying the local traces of related events associated with the plurality of software applications comprises:
filtering the local traces to include only those that are associated with a particular geographic region, a particular timeframe, a particular type of user, or contain one or more particular keywords.

5. The method of claim 1, further comprising:
using one or more clustering models, assigning the local traces into clusters based on semantic similarity of events within the local traces, wherein the positive rules and the negative rules are based on the assignments of the local traces into the clusters.

6. The method of claim 5, further comprising:
based on their assigned clusters, respectively associate the local traces with topics, wherein the topics are related to semantic content of their associated local traces, and wherein the determination of the positive rules and the negative rules is influenced by the topics.

7. The method of claim 6, further comprising:
based on human input, refine the associations between the local traces and the topics.

8. The method of claim 1, wherein iteratively training the similarity model comprises:
iteratively training the similarity model to project the local traces into a vector space such that the pairs of the local traces that are linked to the common global traces exhibit the greater similarity with one another than the pairs of the local traces that are linked to different global traces.

9. The method of claim 8, wherein iteratively training the similarity model is also based on the pairs of the local traces that are linked to different global traces.

10. The method of claim 8, wherein the similarity model maps the vector space to a numeric similarity value with a predefined range.

11. The method of claim 8, further comprising:
using a locality-preserving hash function, map vectors associated with each of the local traces into one of an array of buckets;
using the locality-preserving hash function to determine a particular local bucket for a further local trace; and
linking the further local trace to a particular global trace by comparing the further local trace only to a set of the local traces that are mapped to the particular local bucket.

12. The method of claim 11, wherein comparing the further local trace only to the set of the local traces that are mapped to the particular local bucket comprises:
using a further similarity model, calculating pairwise similarity values for the further local trace and each of the set of the local traces;
determining that one or more of the pairwise similarity values exceed a predetermined threshold; and
linking the further local trace to at least some of the local traces for which the pairwise similarity values exceeded the predetermined threshold.

13. The method of claim 1, wherein iteratively training the similarity model comprises:
calculating a numeric similarity value for a pair of the local traces;
using a loss function, calculating a loss value by comparing the numeric similarity value with whether the pair of the local traces are linked to a common global trace; and
adjusting parameters of the similarity model based on the loss value.

14. A non-transitory computer-readable medium, having stored thereon program instructions that, upon execution by a computing system, cause the computing system to perform operations comprising:
identifying local traces of related events associated with a plurality of software applications;
determining positive rules that define when pairs of the local traces are linked to a common global trace, and negative rules that define when the pairs of the local traces are linked to different global traces;
based on the positive rules and the negative rules, linking the pairs of the local traces into global traces; and
using the pairs of the local traces that are linked to the global traces as training data, iteratively training a similarity model such that the pairs of the local traces that are linked to common global traces exhibit a greater similarity with one another than the pairs of the local traces that are linked to different global traces.

15. The non-transitory computer-readable medium of claim 14, wherein identifying the local traces of related events associated with the plurality of software applications comprises:
determining a local trace as a set of related events that: (i) identify a particular user, (ii) have timestamps within a predefined threshold period of time, or (iii) contain semantically similar textual content.

16. The non-transitory computer-readable medium of claim 14, wherein identifying the local traces of related events associated with the plurality of software applications comprises:
filtering the local traces to include only those that are associated with a particular geographic region, a particular timeframe, a particular type of user, or contain one or more particular keywords.

17. The non-transitory computer-readable medium of claim 14, the operations further comprising:

using one or more clustering models, assigning the local traces into clusters based on semantic similarity of events within the local traces, wherein the positive rules and the negative rules are based on the assignments of the local traces into the clusters.

18. The non-transitory computer-readable medium of claim 17, the operations further comprising:

based on their assigned clusters, respectively associate the local traces with topics, wherein the topics are related to semantic content of their associated local traces, and wherein the determination of the positive rules and the negative rules is influenced by the topics.

19. The non-transitory computer-readable medium of claim 14, wherein iteratively training the similarity model comprises:

iteratively training the similarity model to project the local traces into a vector space such that the pairs of the local traces that are linked to the common global traces exhibit the greater similarity with one another than the pairs of the local traces that are linked to different global traces.

20. A computing system comprising:

one or more processors;

memory; and program instructions, stored in the memory, that upon execution by the one or more processors cause the computing system to perform operations comprising:

identifying local traces of related events associated with a plurality of software applications;

determining positive rules that define when pairs of the local traces are linked to a common global trace, and negative rules that define when the pairs of the local traces are linked to different global traces;

based on the positive rules and the negative rules, linking the pairs of the local traces into global traces; and using the pairs of the local traces that are linked to the global traces as training data, iteratively training a similarity model such that the pairs of the local traces that are linked to common global traces exhibit a greater similarity with one another than the pairs of the local traces that are linked to different global traces.

* * * * *